US012731537B2

(12) United States Patent
Min et al.

(10) Patent No.: US 12,731,537 B2
(45) Date of Patent: Sep. 8, 2026

(54) DISPLAY DEVICE AND ELECTRONIC DEVICE INCLUDING THE SAME

(71) Applicant: Samsung Display Co., Ltd., Yongin-Si (KR)

(72) Inventors: Junyoung Min, Yongin-si (KR); Hyojoon Song, Yongin-si (KR); Junwon Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/180,149

(22) Filed: Apr. 16, 2025

(65) Prior Publication Data

US 2026/0051283 A1 Feb. 19, 2026

(30) Foreign Application Priority Data

Aug. 19, 2024 (KR) ........................ 10-2024-0110237

(51) Int. Cl.
*G09G 3/32* (2016.01)

(52) U.S. Cl.
CPC ....... *G09G 3/32* (2013.01); *G09G 2300/0842* (2013.01)

(58) Field of Classification Search
CPC ......................... G09G 3/32; G09G 2300/0842
See application file for complete search history.

(56) References Cited

U.S. PATENT DOCUMENTS

| | | | | |
|---|---|---|---|---|
| 11,636,805 | B2 | 4/2023 | Jang et al. | |
| 2021/0134918 | A1* | 5/2021 | Moon | H10D 86/481 |
| 2023/0081823 | A1* | 3/2023 | Noh | H10K 59/1216 257/211 |
| 2023/0282703 | A1* | 9/2023 | Kim | H10D 62/121 |
| 2023/0389257 | A1* | 11/2023 | Song | H10B 10/125 |
| 2024/0381709 | A1* | 11/2024 | Ding | H10K 59/1201 |

FOREIGN PATENT DOCUMENTS

| | | | |
|---|---|---|---|
| KR | 10-0219504 | B1 | 9/1999 |
| KR | 10-2022-0092315 | A | 7/2022 |

* cited by examiner

*Primary Examiner* — Pegeman Karimi
(74) *Attorney, Agent, or Firm* — Innovation Counsel LLP

(57) ABSTRACT

A display device includes a first lower active pattern, a first lower gate electrode disposed on the first lower active pattern and forming a storage capacitor together with the lower active pattern, a second lower gate electrode disposed on the first lower gate electrode and forming a first compensation capacitor together with the first lower gate electrode, an upper active pattern disposed on the second lower gate electrode and electrically connected to the first lower gate electrode, and an upper gate electrode disposed on the upper active pattern and electrically connected to the first lower active pattern.

20 Claims, 29 Drawing Sheets

DISPLAY DEVICE AND ELECTRONIC DEVICE INCLUDING THE SAME

CROSS-REFERENCE TO RELATED APPLICATION(S)

This application claims priority to Korean Patent Application No. 10-2024-0110237, filed on Aug. 19, 2024, and all the benefits accruing therefrom under 35 U.S.C. § 119, the content of which in its entirety is herein incorporated by reference.

BACKGROUND

1. Field

Implementations of the inventive concept relate generally to a display device.

2. Discussion of the Background

A display device includes a pixel circuit layer and a light emitting layer. The pixel circuit layer generates a driving current, and the light emitting layer emits light corresponding to the driving current.

A plurality of transistors and a plurality of capacitors are formed in the pixel circuit layer. The transistors and the capacitors are implemented using metal patterns and metal lines that are stacked to each other.

SUMMARY

Embodiments of the present disclosure provide a display device and an electronic device including the display device.

According to an embodiment, a display device includes a first lower active pattern disposed on a substrate, a first lower gate electrode disposed on the first lower active pattern and forming a storage capacitor together with the first lower active pattern, a second lower gate electrode disposed on the first lower gate electrode and forming a first compensation capacitor together with the first lower gate electrode, an upper active pattern disposed on the second lower gate electrode and electrically connected to the first lower gate electrode, and an upper gate electrode disposed on the upper active pattern and electrically connected to the first lower active pattern.

The first lower gate electrode may overlap the first lower active pattern and the second lower gate electrode.

An area of the first lower active pattern may be greater than an area of the upper gate electrode.

An area of the first lower gate electrode may be greater than an area of the upper gate electrode.

An area of the second lower gate electrode may be greater than an area of the upper gate electrode.

The second lower gate electrode, the upper active pattern, and the upper gate electrode may form a driving transistor.

A data voltage may be applied to the upper gate electrode.

Each of the first lower active pattern, the first lower gate electrode, the second lower gate electrode, the upper active pattern, and the upper gate electrode may have an island shape.

The display device may further include a storage connection electrode disposed on the upper gate electrode and connecting the first lower active pattern to the upper gate electrode.

The storage connection electrode may have an island shape.

The display device may further include a reference voltage vertical line disposed on the storage connection electrode and overlapping the storage connection electrode.

The display device may further include a first compensation connection electrode disposed on the upper gate electrode and connecting the first lower gate electrode to the upper active pattern.

The first compensation connection electrode may have an island shape.

The display device may further include a data line disposed on the first compensation connection electrode, and the first compensation connection electrode may overlap the upper gate electrode and the data line.

The first lower active pattern may include a silicon semiconductor material, and the first lower active pattern may be entirely doped with impurities.

The display device may further include a first active pattern disposed on a same layer as the first lower active pattern and including the silicon semiconductor material, and the first active pattern may be partially doped with impurities.

The upper gate electrode may directly contact the first lower active pattern.

The display device may further include a second active pattern disposed on a same layer as the first lower active pattern, forming a second compensation capacitor together with the first lower gate electrode, and electrically connected to the second lower gate electrode.

The display device may further include a first compensation connection electrode disposed on the upper gate electrode and connecting the first lower gate electrode to the upper active pattern, and a second compensation connection electrode disposed on a same layer as the first compensation connection electrode and connecting the second lower active pattern to the second lower gate electrode.

According to an embodiment, a display device includes a first lower active pattern disposed on a substrate, a first lower gate electrode disposed on the first lower active pattern and forming a compensation capacitor together with the first lower active pattern, a second lower gate electrode disposed on the first lower gate electrode and forming a storage capacitor together with the first lower gate electrode, an upper active pattern disposed on the second lower gate electrode and electrically connected to the first lower gate electrode, and an upper gate electrode disposed on the upper active pattern and electrically connected to the first lower active pattern. A data voltage may be applied to the second lower gate electrode.

According to an embodiment, an electronic device includes a host, a display device receiving a control signal and image data from the host, and a power supply configured to provide power to the display device. The display device may include a first lower active pattern disposed on a substrate, a first lower gate electrode disposed on the first lower active pattern and forming a storage capacitor together with the first lower active pattern, a second lower gate electrode disposed on the first lower gate electrode and forming a first compensation capacitor together with the first lower gate electrode, an upper active pattern disposed on the second lower gate electrode and electrically connected to the first lower gate electrode, and an upper gate electrode disposed on the upper active pattern and electrically connected to the first lower active pattern.

A display device according to embodiments of the present disclosure may include a lower active pattern, a first lower gate electrode, and a second lower gate electrode. The lower active pattern, the first lower gate electrode, and the second lower gate electrode may be disposed on different layers and may overlap each other. Accordingly, the areas of the lower active pattern, the first lower gate electrode, and the second lower gate electrode may be formed relatively large, respectively. In other words, the display device according to embodiments of the present disclosure may secure relatively large areas of the lower active pattern, the first lower gate electrode, and the second lower gate electrode, respectively.

As the area of each of the lower active pattern and the first lower gate electrode is sufficiently secured, the capacitance of the storage capacitor formed between the lower active pattern and the first lower gate electrode may increase.

As the area of each of the first lower gate electrode and the second lower gate electrode is sufficiently secured, the capacitance of the compensation capacitor formed between the first lower gate electrode and the second lower gate electrode may increase.

BRIEF DESCRIPTION OF THE DRAWINGS

The accompanying drawings, which are included to provide a further understanding of the inventive concept and are incorporated in and constitute a part of this specification, illustrate embodiments of the inventive concept together with the description.

DETAILED DESCRIPTION

Illustrative, non-limiting embodiments will be more clearly understood from the following detailed description in conjunction with the accompanying drawings.

Figure 1:
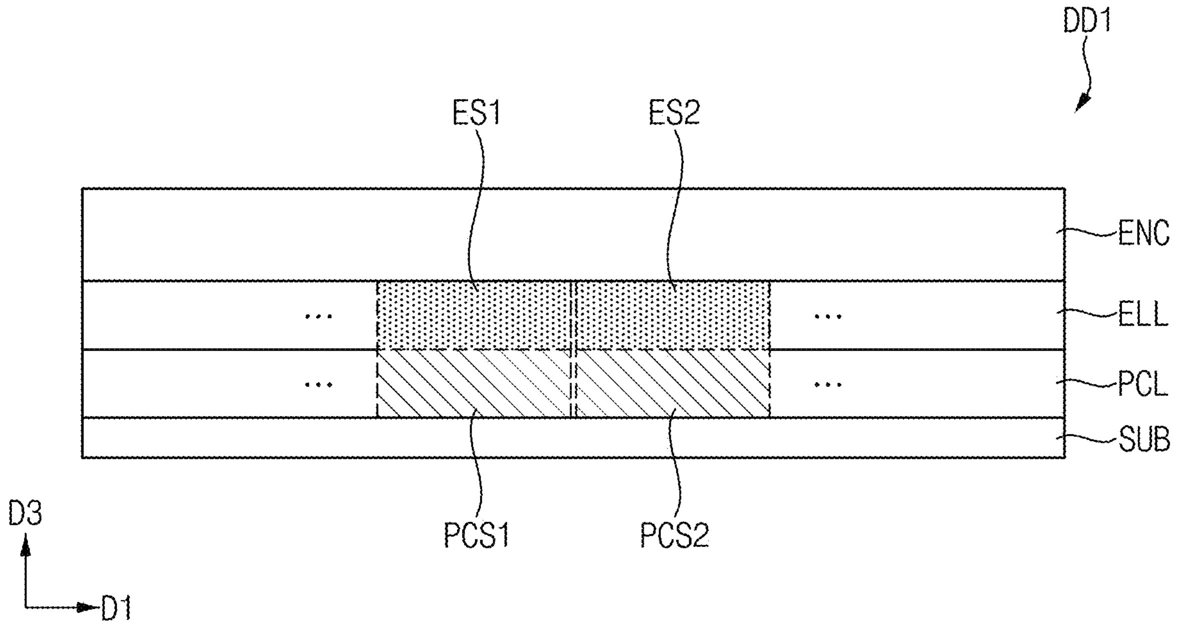
FIG. 1 is a cross-sectional view illustrating a display device according to an embodiment of the present disclosure.

FIG. 1 is a cross-sectional view illustrating a display device according to an embodiment of the present disclosure.

Referring to FIG. 1, a display device DD1 according to an embodiment of the present disclosure may include a substrate SUB, a pixel circuit layer PCL, a light emitting layer ELL, and an encapsulation layer ENC.

The pixel circuit layer PCL may include at least one pixel circuit structure. For example, the pixel circuit layer PCL may include a first pixel circuit structure PCS1 and a second pixel circuit structure PCS2.

The light emitting layer ELL may include at least one light emitting structure. For example, the light emitting layer ELL may include a first light emitting structure ES1 and a second light emitting structure ES2.

The pixel circuit layer PCL may be disposed on the substrate SUB.

The first pixel circuit structure PCS1 and the second pixel circuit structure PCS2 may be arranged side by side along a first direction D1. Each of the first and second pixel circuit structures PCS1 and PCS2 may receive a signal and/or voltage and may generate a driving current.

The light emitting layer ELL may be disposed on the pixel circuit layer PCL.

The first and second light emitting structures ES1 and ES2 may be electrically connected to the first and second pixel circuit structures PCS1 and PCS2, respectively. The first light emitting structure ES1 may receive a driving current from the first pixel circuit structure PCS1 and may emit light. The second light emitting structure ES2 may receive a driving current from the second pixel circuit structure PCS2 and may emit light.

The encapsulating layer ENC may be disposed on the light emitting layer ELL. The encapsulating layer ENC may encapsulate the light emitting layer ELL.

Figure 2:
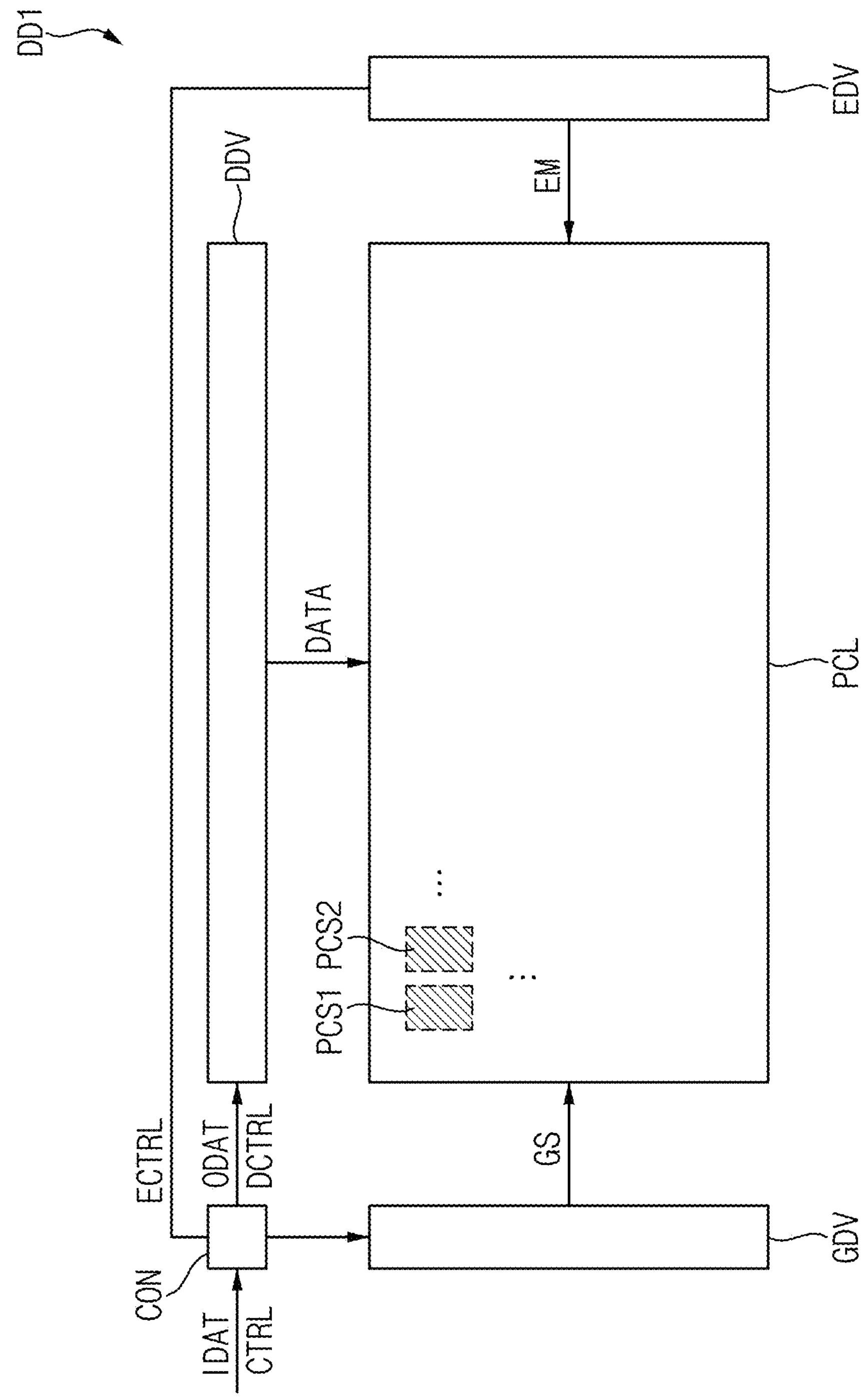
FIG. 2 is a block diagram illustrating a pixel circuit layer included in the display device of FIG. 1.
Figure 3:
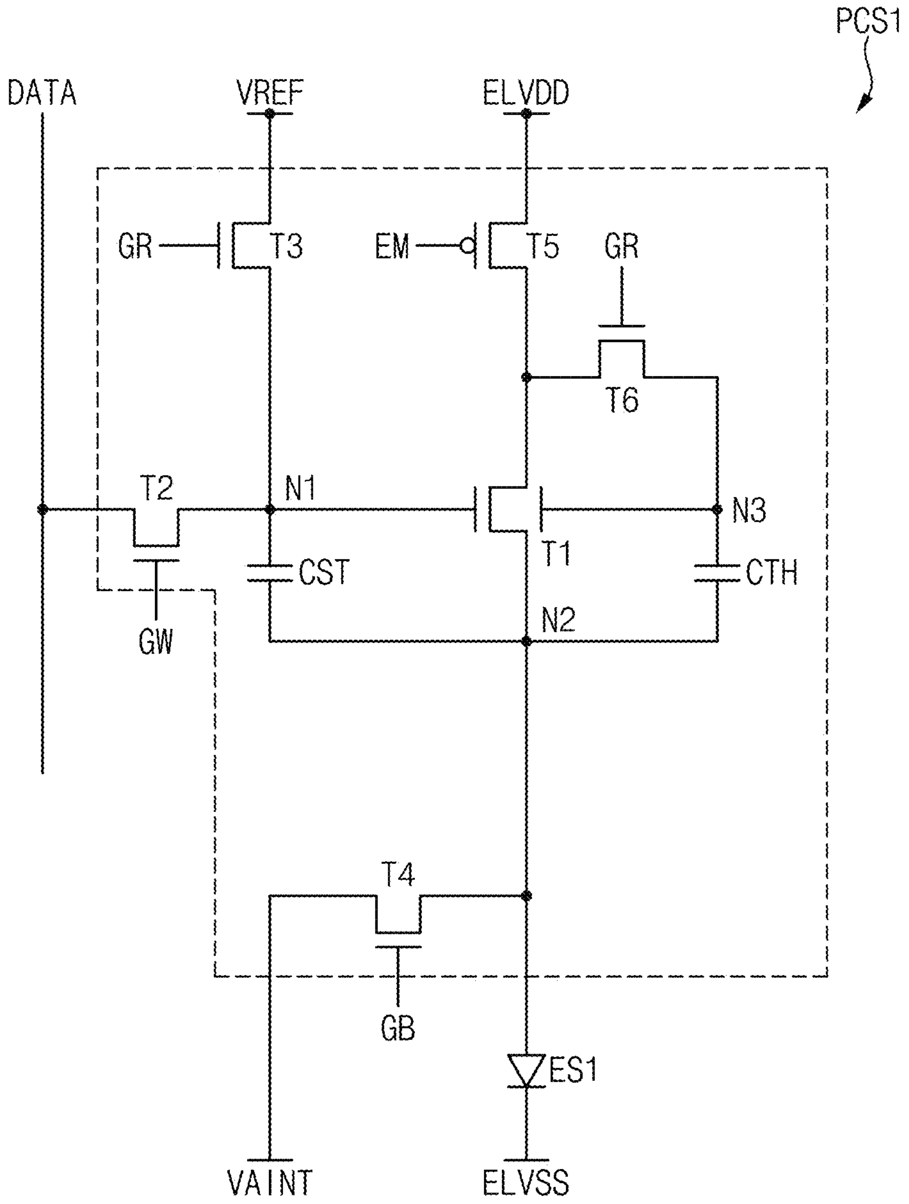
FIG. 3 is a circuit diagram illustrating a pixel circuit structure included in the pixel circuit layer of FIG. 2.

FIG. 2 is a block diagram illustrating a pixel circuit layer included in the display device of FIG. 1. FIG. 3 is a circuit diagram illustrating a pixel circuit structure included in the pixel circuit layer of FIG. 2.

Referring to FIG. 2, the display device DD1 may include the pixel circuit layer PCL, a data driver DDV, a gate driver GDV, an emission driver EDV, and a timing controller CON.

The pixel circuit layer PCL may include the first and second pixel circuit structures PCS1 and PCS2. Each of the first and second pixel circuit structures PCS1 and PCS2 may be electrically connected to the data driver DDV, the gate driver GDV, and the emission driver EDV.

The data driver DDV may receive output image data ODAT and a data control signal DCTRL from the timing controller CON and may generate a data voltage DATA.

The gate driver GDV may receive a gate control signal GCTRL from the timing controller CON and may generate a gate signal GS (e.g., a first gate signal GW, a second gate signal GR, and a third gate signal GB of FIG. 3).

The emission driver EDV may receive an emission driving control signal ECTRL from the timing controller CON and may generate the emission control signal EM.

The timing controller CON may receive a control signal CTRL and input image data IDAT from an external device (e.g., a host or a processor), and may control the data driver DDV, the gate driver GDV, and the emission driver EDV.

Referring to FIG. 3, the first pixel circuit structure PCS1 may provide a driving current to the first light emitting structure ES1. The first pixel circuit structure PCS1 may include a first transistor T1, a second transistor T2, a third transistor T3, a fourth transistor T4, a fifth transistor T5, a sixth transistor T6, a storage capacitor CST, and a compensation capacitor CTH.

The first transistor T1 may include a gate terminal, a lower gate terminal, a first terminal, and a second terminal.

The gate terminal of the first transistor T1 may be electrically connected to the second transistor T2 and the storage capacitor CST through a first node N1. The data voltage DATA may be applied to the gate terminal.

The lower gate terminal of the first transistor T1 may be electrically connected to the compensation capacitor CTH through a third node N3.

The first terminal of the first transistor T1 may be electrically connected to the fifth transistor T5 and the sixth transistor T6.

The second terminal of the first transistor T1 may be electrically connected to the fourth transistor T4 and the first light emitting structure ES1 through a second node N2.

The first transistor T1 may generate a driving current based on a high power voltage ELVDD and the data voltage DATA. For example, the first transistor T1 may be referred to as a driving transistor.

The second transistor T2 may include a gate terminal, a first terminal, and a second terminal.

The gate terminal of the second transistor T2 may be applied with a first gate signal GW.

The first terminal of the second transistor T2 may be electrically connected to the data voltage DATA.

The second terminal of the second transistor T2 may be electrically connected to the first node N1.

The second transistor T2 may be turned on or turned off in response to the first gate signal GW. For example, when the second transistor T2 is an NMOS transistor, the second transistor T2 may be turned on when the first gate signal GW has a positive voltage level (e.g., a high voltage), and may be turned off when the first gate signal GW has a negative voltage level (e.g., a low voltage). The second transistor T2 may transmit the data voltage DATA to the first transistor T1 when the second transistor T2 is turned on.

The third transistor T3 may include a gate terminal, a first terminal, and a second terminal.

The gate terminal of the third transistor T3 may be applied with a second gate signal GR.

The first terminal of the third transistor T3 may be provided with a reference voltage VREF.

The second terminal of the third transistor T3 may be electrically connected to the first node N1.

The third transistor T3 may be turned on or off in response to the second gate signal GR. For example, when the third transistor T3 is an NMOS transistor, the third transistor T3 may be turned on when the second gate signal GR has a positive voltage level (e.g., a high voltage), and may be turned off when the second gate signal GR has a negative voltage level (e.g., a low voltage). The third transistor T3 may transmit the reference voltage VREF to the first node N1 when the third transistor T3 is turned on.

The fourth transistor T4 may include a gate terminal, a first terminal, and a second terminal.

The gate terminal of the fourth transistor T4 may be provided with a third gate signal GB.

The first terminal of the fourth transistor T4 may be provided with an initialization voltage VAINT.

The second terminal of the fourth transistor T4 may be electrically connected to the first light emitting structure ES1.

The fourth transistor T4 may be turned on or off in response to the third gate signal GB. For example, when the fourth transistor T4 is an NMOS transistor, the fourth transistor T4 may be turned on when the third gate signal GB has a positive voltage level (e.g., a high voltage), and may be turned off when the third gate signal GB has a negative voltage level (e.g., a low voltage). The fourth transistor T4 may transmit the initialization voltage VAINT to the first light emitting structure ES1 when the fourth transistor T4 is turned on.

The fifth transistor T5 may include a gate terminal, a first terminal, and a second terminal.

The gate terminal of the fifth transistor T5 may be applied with the emission control signal EM.

The first terminal of the fifth transistor T5 may be applied with the high power voltage ELVDD.

The second terminal of the fifth transistor T5 may be electrically connected to the first transistor T1.

The fifth transistor T5 may be turned on or off in response to the emission control signal EM. For example, when the fifth transistor T5 is a PMOS transistor, the fifth transistor T5 may be turned off when the emission control signal EM has a positive voltage level (e.g., a high voltage), and may be turned on when the emission control signal EM has a negative voltage level (e.g., a low voltage). The fifth transistor T5 may transmit the high power voltage ELVDD to the first transistor T1 when the fifth transistor T5 is turned on.

The sixth transistor T6 may include a gate terminal, a first terminal, and a second terminal.

The gate terminal of the sixth transistor T6 may be applied with the second gate signal GR.

The first terminal of the sixth transistor T6 may be electrically connected to the first transistor T1.

The second terminal of the sixth transistor T6 may be electrically connected to the third node N3.

The sixth transistor T6 may be turned on or off in response to the second gate signal GR. For example, when the sixth transistor T6 is an NMOS transistor, the sixth transistor T6 may be turned on when the second gate signal GR has a positive voltage level (e.g., a high voltage), and may be turned off when the second gate signal GR has a negative voltage level (e.g., a low voltage).

As described above, each of the first, second, third, fourth, and sixth transistors T1, T2, T3, T4, and T6 may be an NMOS transistor, and the fifth transistor T5 may be a PMOS transistor. However, the present disclosure is not limited thereto.

The storage capacitor CST may include a first terminal and a second terminal.

The first terminal of the storage capacitor CST may be electrically connected to the first node N1.

The second terminal of the storage capacitor CST may be electrically connected to the second node N2.

The compensation capacitor CTH may include a first terminal and a second terminal.

The first terminal of the compensation capacitor CTH may be electrically connected to the second node N2.

The second terminal of the compensation capacitor CTH may be electrically connected to the third node N3.

However, the circuit structure of the first pixel circuit structure PCS1 is not limited thereto. For example, the number of transistors, the number of capacitors, and the connection relationship thereof included in the first pixel circuit structure PCS1 may be appropriately set as needed.

As the circuit structure of the second pixel circuit structure PCS2 may be substantially same as the circuit structure of the first pixel circuit structure PCS1, the detailed description of the second pixel structure PCS2 is omitted.

The first light emitting structure ES1 may include a first terminal and a second terminal. The first terminal of the first light emitting structure ES1 may be electrically connected to the second node N2. The second terminal of the first light emitting structure ES1 may be applied with a low power supply voltage ELVSS. The first light emitting structure ES1 may emit light corresponding to the driving current.

Figure 4:
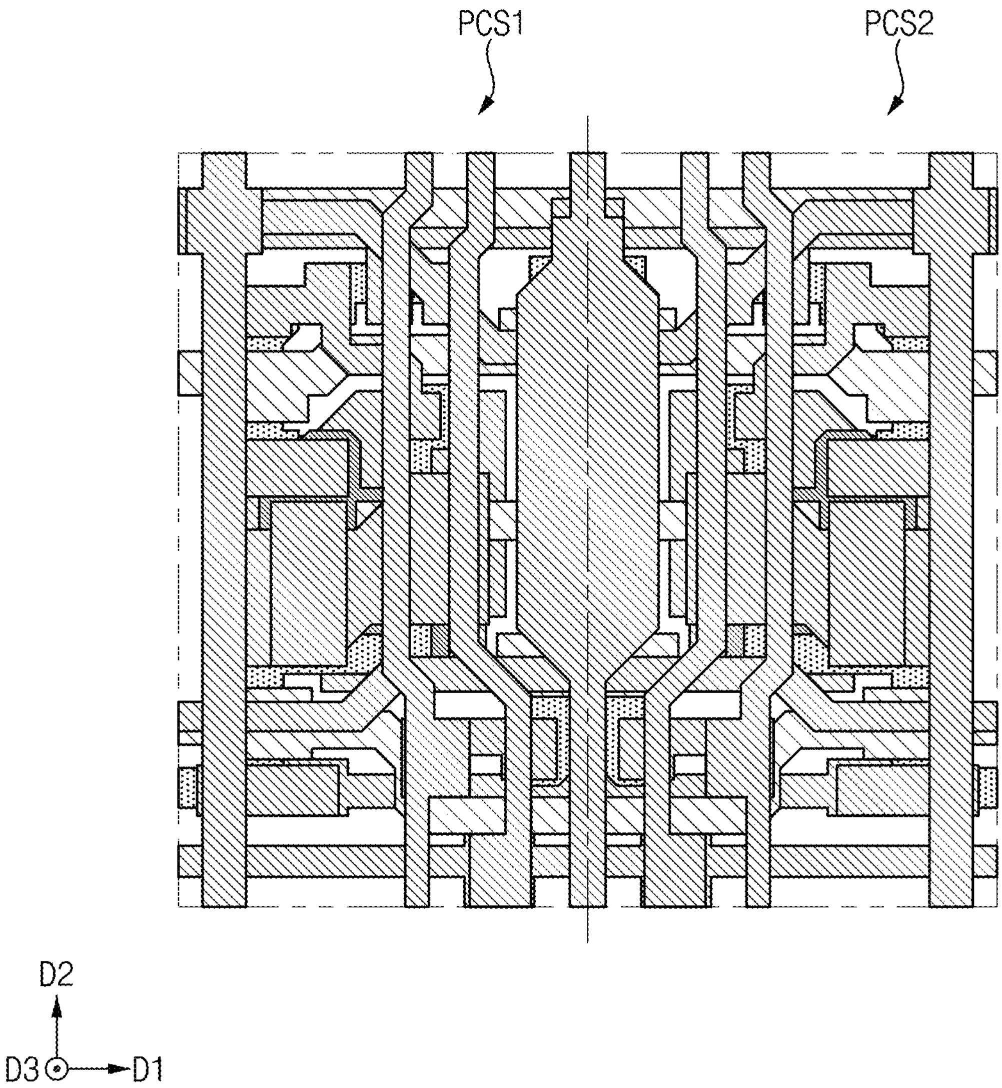
FIG. 4 is a plan view illustrating a pixel circuit structure included in the display device of FIG. 1.

FIG. 4 is a plan view illustrating a pixel circuit structure included in the display device of FIG. 1. FIGS. 5 to 19 are plan views illustrating a method of manufacturing the pixel circuit structure of FIG. 4. FIG. 20 is a cross-sectional view illustrating the display device of FIG. 1.

Referring to FIG. 4, the display device DD1 may include the first and second pixel circuit structures PCS1 and PCS2. In an embodiment, the first and second pixel circuit structures PCS1 and PCS2 may be arranged side by side along the first direction D1. In addition, the second pixel circuit structure PCS2 may be symmetrical to the first pixel circuit structure PCS1 with respect to a symmetry axis extending in a second direction D2 intersecting the first direction D1 between the first pixel circuit structure PCS1 and the second pixel circuit structure PCS2. In addition, the first and second pixel circuit structures PCS1 and PCS2 may have a thickness in a third direction D3 intersecting the first and second directions D1 and D2.

Figure 5:
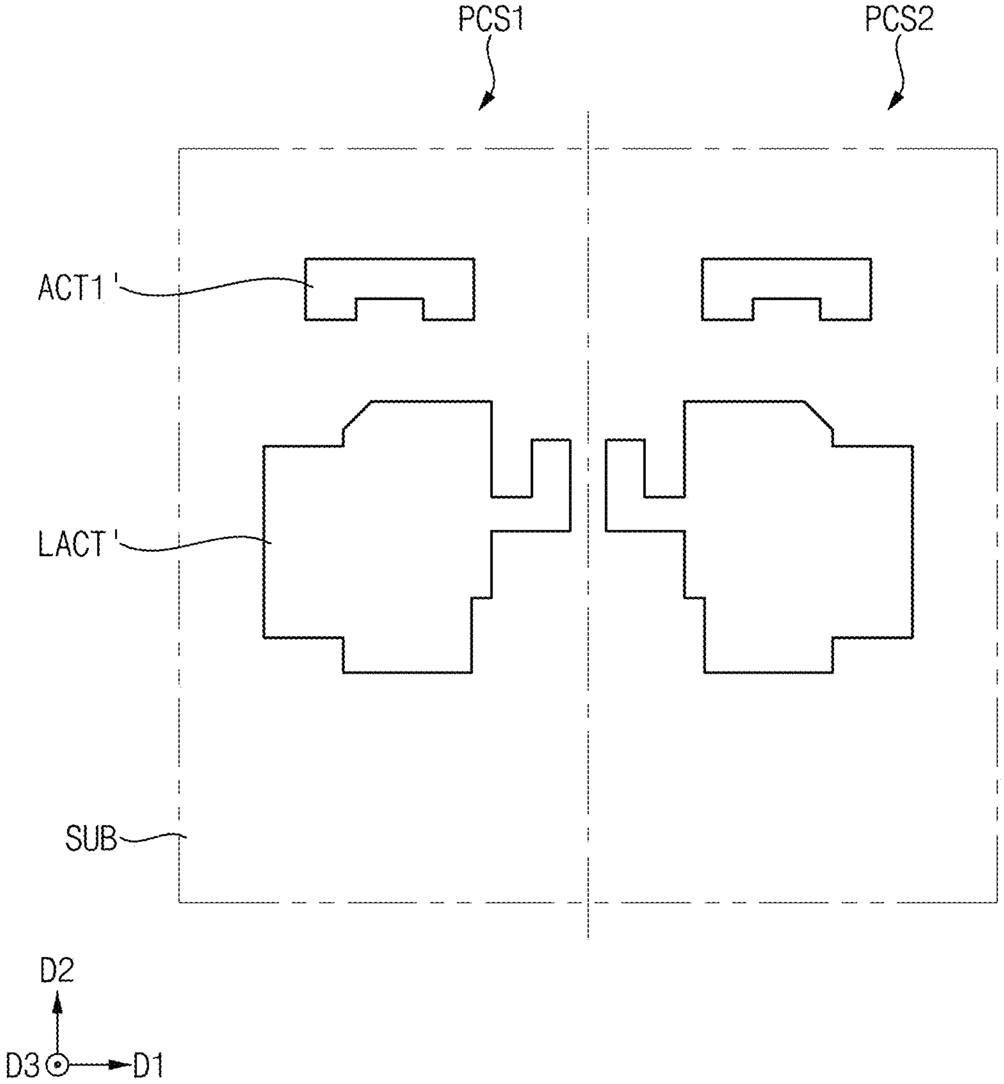
FIGS. 5 to 19 are plan views illustrating a method of manufacturing the pixel circuit structure of FIG. 4.

Referring to FIGS. 5 and 20, the substrate SUB may include a transparent or opaque material. In an embodiment, the substrate SUB may include any one of glass, quartz, and plastic. For example, when the substrate SUB is formed of plastic, the substrate SUB may include at least one of polyimide, polyethersulfone, polyacrylate, polyetherimide, polyethylene naphthalate, polyethylene terephthalate, polyphenylene sulfide, polyarylate, polycarbonate, or cellulose acetate propionate.

A preliminary lower active pattern LACT' and a preliminary first active pattern ACT1' may be formed on the substrate SUB.

According to an embodiment, the preliminary lower active pattern LACT' and the preliminary first active pattern ACT1' may include silicon semiconductor. For example, the preliminary lower active pattern LACT' and the preliminary first active pattern ACT1' may include amorphous silicon or polycrystalline silicon.

Each of the preliminary lower active pattern LACT' and the preliminary first active pattern ACT1' may have an island shape. For example, the preliminary lower active pattern LACT' and the preliminary first active pattern ACT1' may not be connected to each other.

Figure 6:
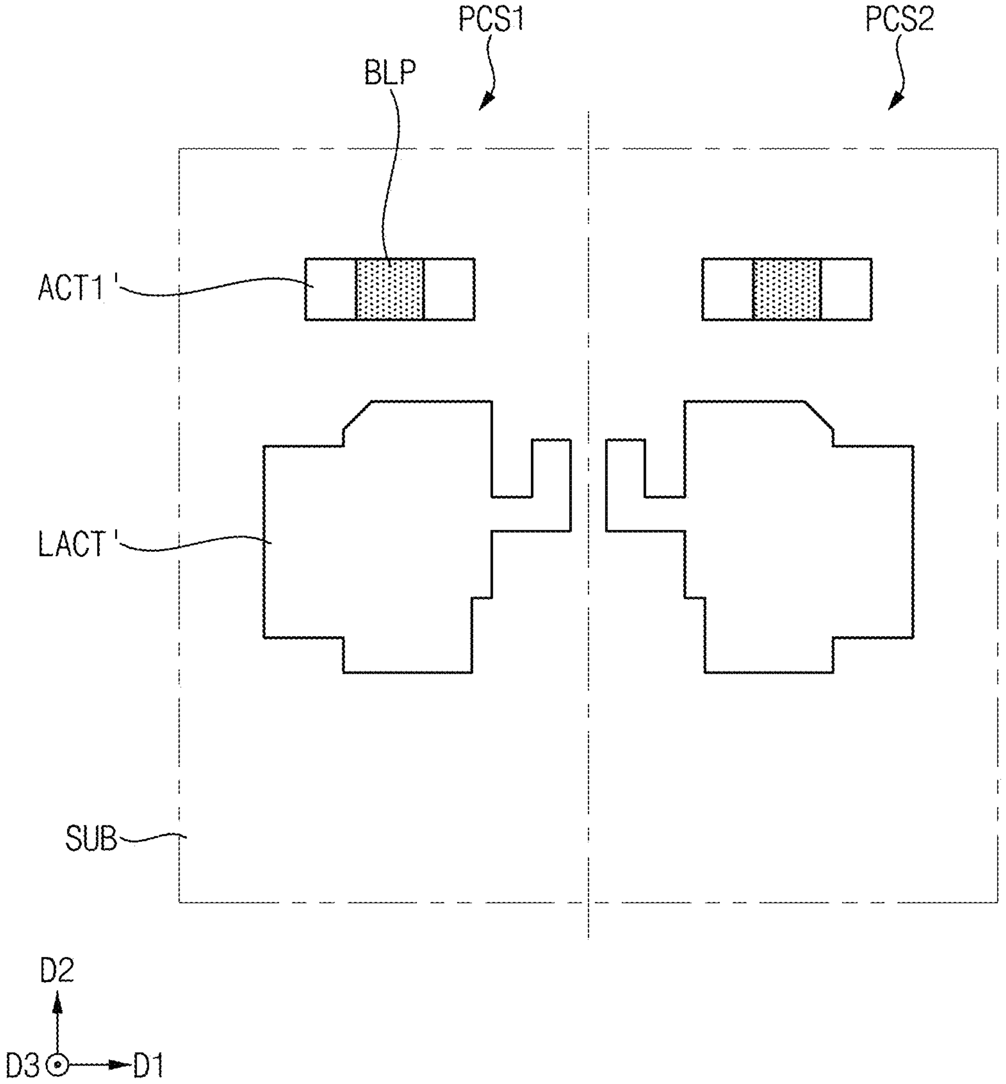

Referring to FIG. 6, a blocking pattern BLP may be disposed on the preliminary first active pattern ACT1'. In an embodiment, the blocking pattern BLP may partially overlap the preliminary first active pattern ACT1'. While the preliminary first active pattern ACT1' is doped with an impurity (e.g., boron, phosphorus, etc.), the blocking pattern BLP may block the impurity.

Figure 7:
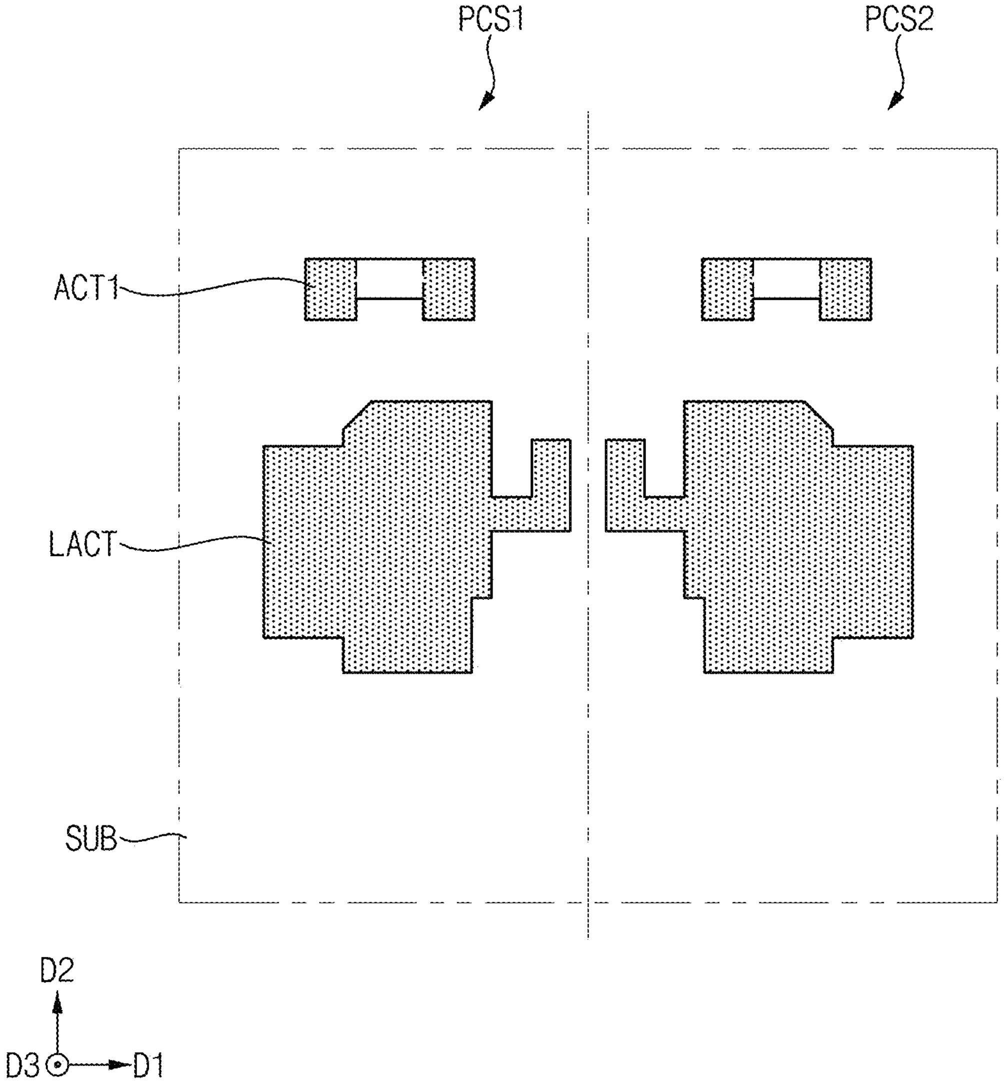

Referring to FIGS. 7 and 20, a lower active pattern LACT and a first active pattern ACT1 may be formed after the preliminary lower active pattern LACT' and the preliminary first active pattern ACT1' are doped with the impurity. In an embodiment, the lower active pattern LACT may have an island shape, and the lower active pattern LACT may be entirely doped with impurities. For example, the lower active pattern LACT may correspond to the first terminal of the storage capacitor CST (see FIG. 3).

The first active pattern ACT1 may have an island shape, and the first active pattern ACT1 may be partially doped with impurities due to the blocking pattern BLP.

In an embodiment, after the doping process described above, the blocking pattern BLP may be removed.

A first insulating layer IL1 may be formed on the substrate SUB and may cover the lower active pattern LACT and the first active pattern ACT1. In an embodiment, the first insulating layer IL1 may include an insulating material. For example, the first insulating layer IL1 may include silicon oxide, silicon nitride, silicon oxynitride, titanium oxide, tantalum oxide, or the like, and may have a single-layer or multi-layer structure.

Figure 8:
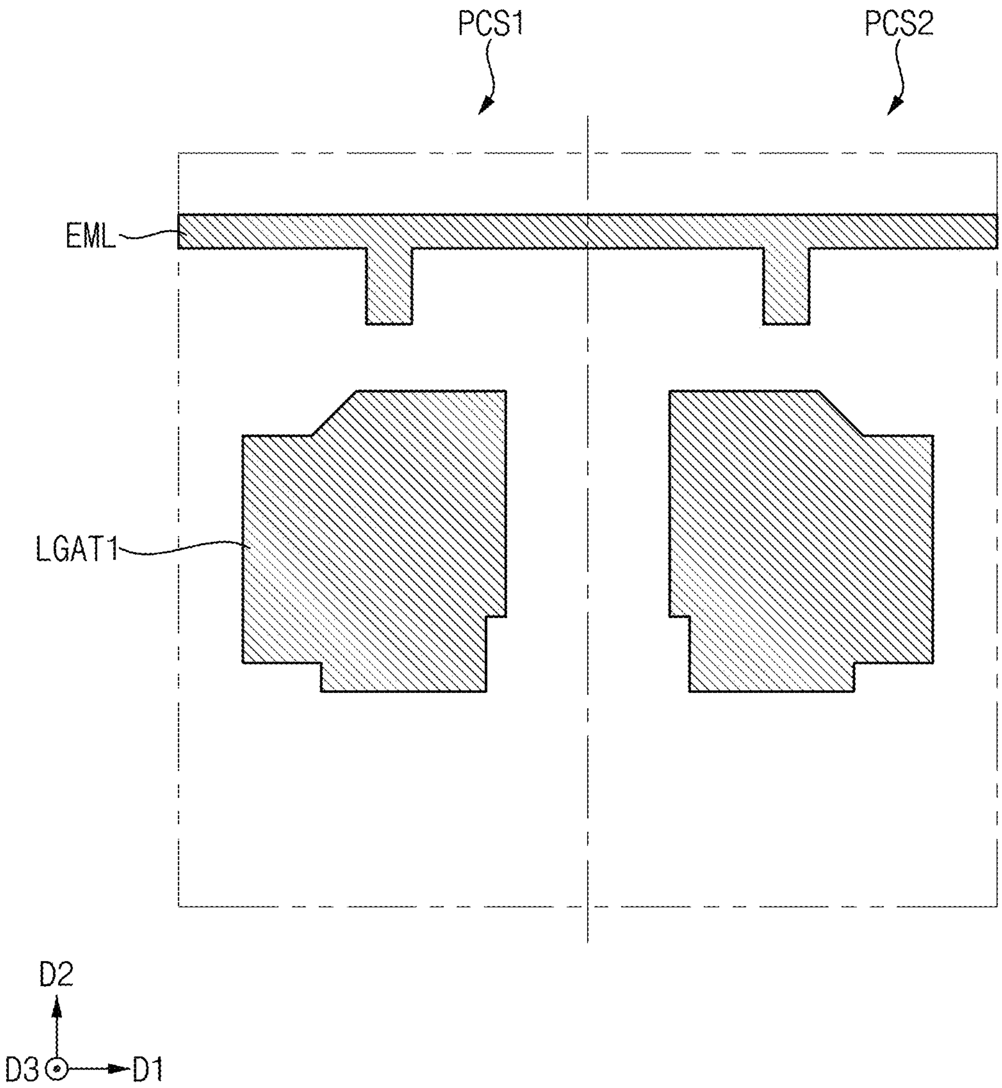
Figure 9:
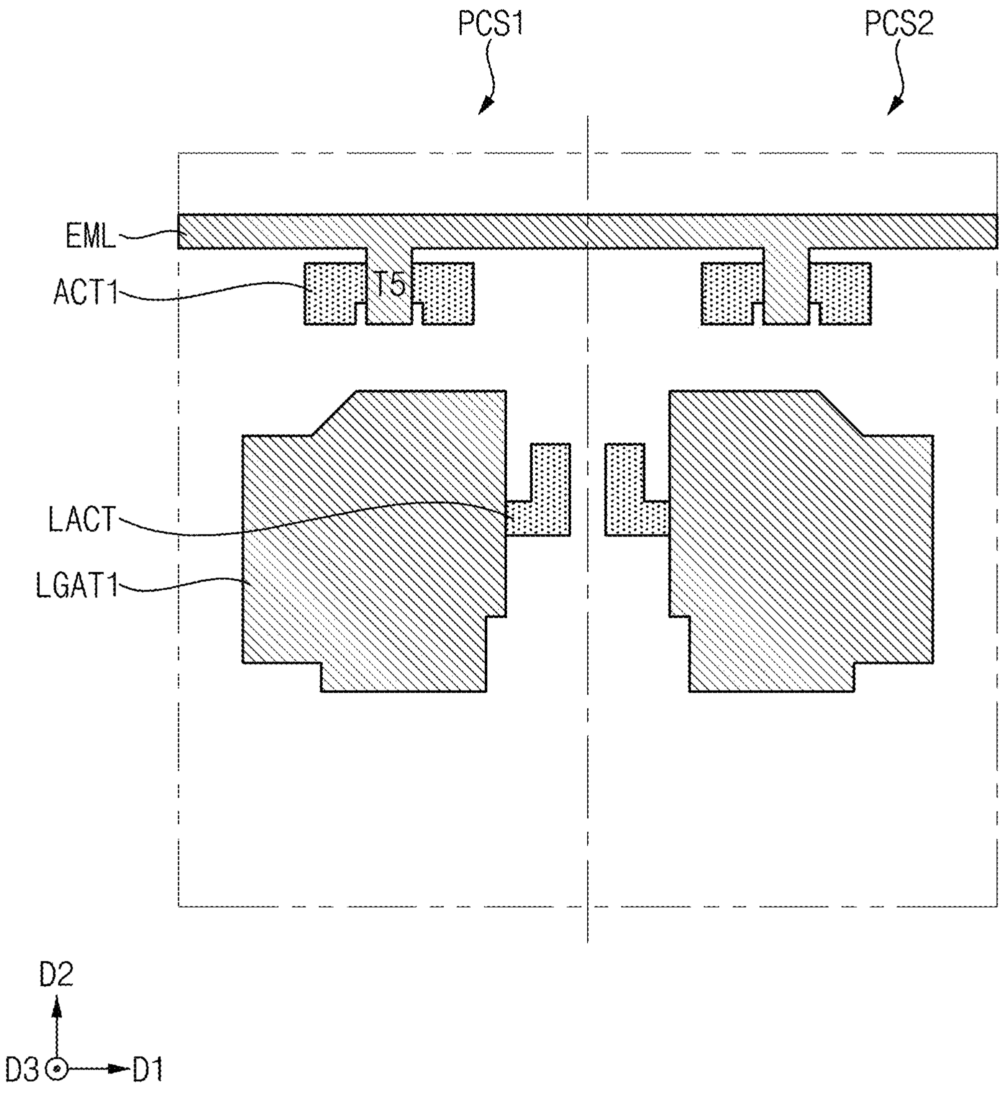

Referring to FIGS. 8, 9, and 20, a first lower gate electrode LGAT1 and an emission control signal line EML may be disposed on the first insulating layer IL1.

In an embodiment, the first lower gate electrode LGAT1 and the emission control signal line EML may include a metal, an alloy, a metal oxide, a metal nitride, or the like.

For example, the first lower gate electrode LGAT1 and the emission control signal line EML may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

In addition, each of the first lower gate electrode LGAT1 and the emission control signal line EML may include a single layer or a multilayer in combination with each other.

In an embodiment, the first lower gate electrode LGAT1 may have an island shape and may overlap the lower active pattern LACT.

For example, the first lower gate electrode LGAT1 may correspond to the second terminal of the storage capacitor CST and to the first terminal of the compensation capacitor CTH (see FIG. 3). In addition, the first lower gate electrode LGAT1 may correspond to the first terminal of the compensation capacitor CTH (see FIG. 3).

The emission control signal line EML may extend in the first direction (D1), and a protrusion of the emission control signal line EML may overlap the first active pattern ACT1.

For example, the emission control signal line EML may transmit the emission control signal EM. The first active pattern ACT1 and the emission control line EML may form the fifth transistor T5 (see FIG. 3).

A second insulating layer IL2 may be formed on the first insulating layer IL1 and may cover the first lower gate electrode LGAT1 and the emission control signal line EML. In an embodiment, the second insulating layer IL2 may include an insulating material. For example, the second insulating layer IL2 may include silicon oxide, silicon nitride, silicon oxynitride, titanium oxide, tantalum oxide, or the like, and may have a single-layer or multi-layer structure.

Figure 10:
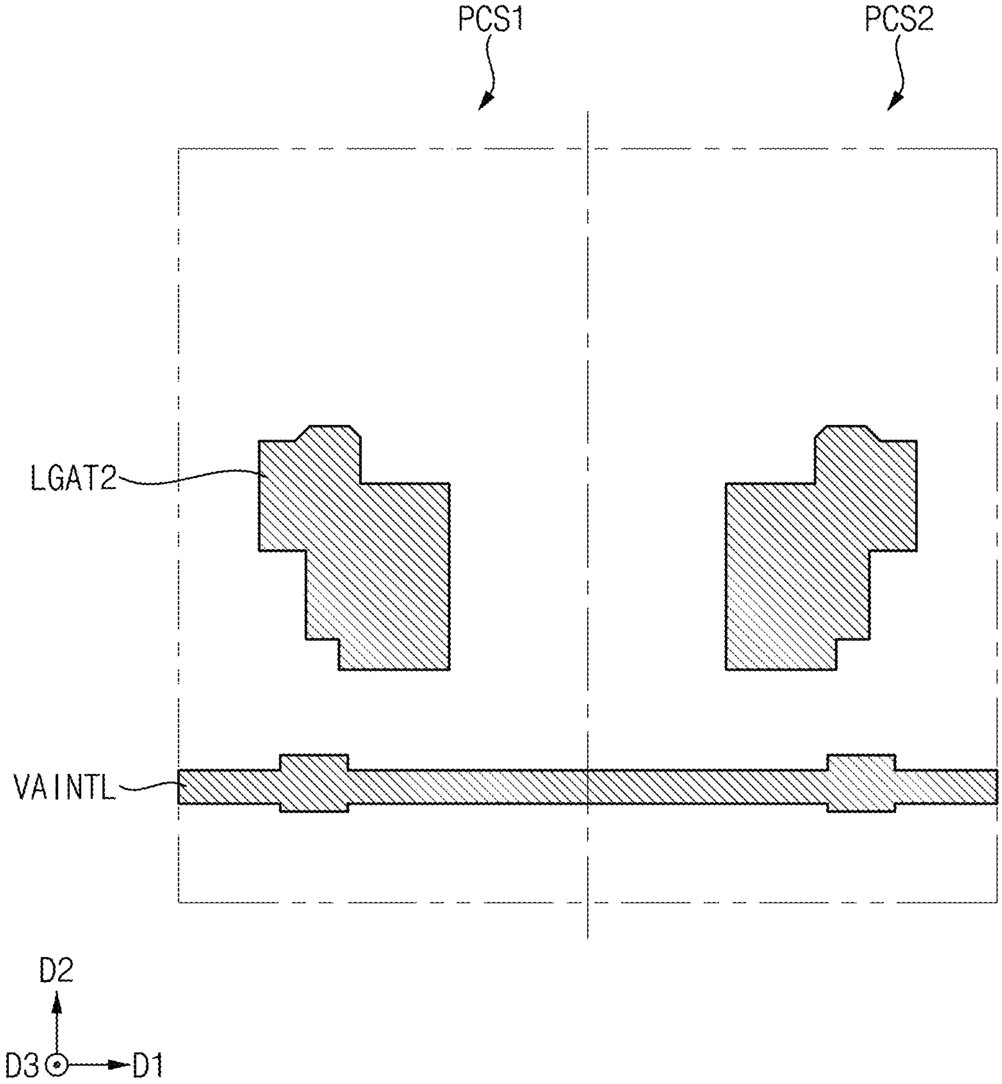
Figure 11:
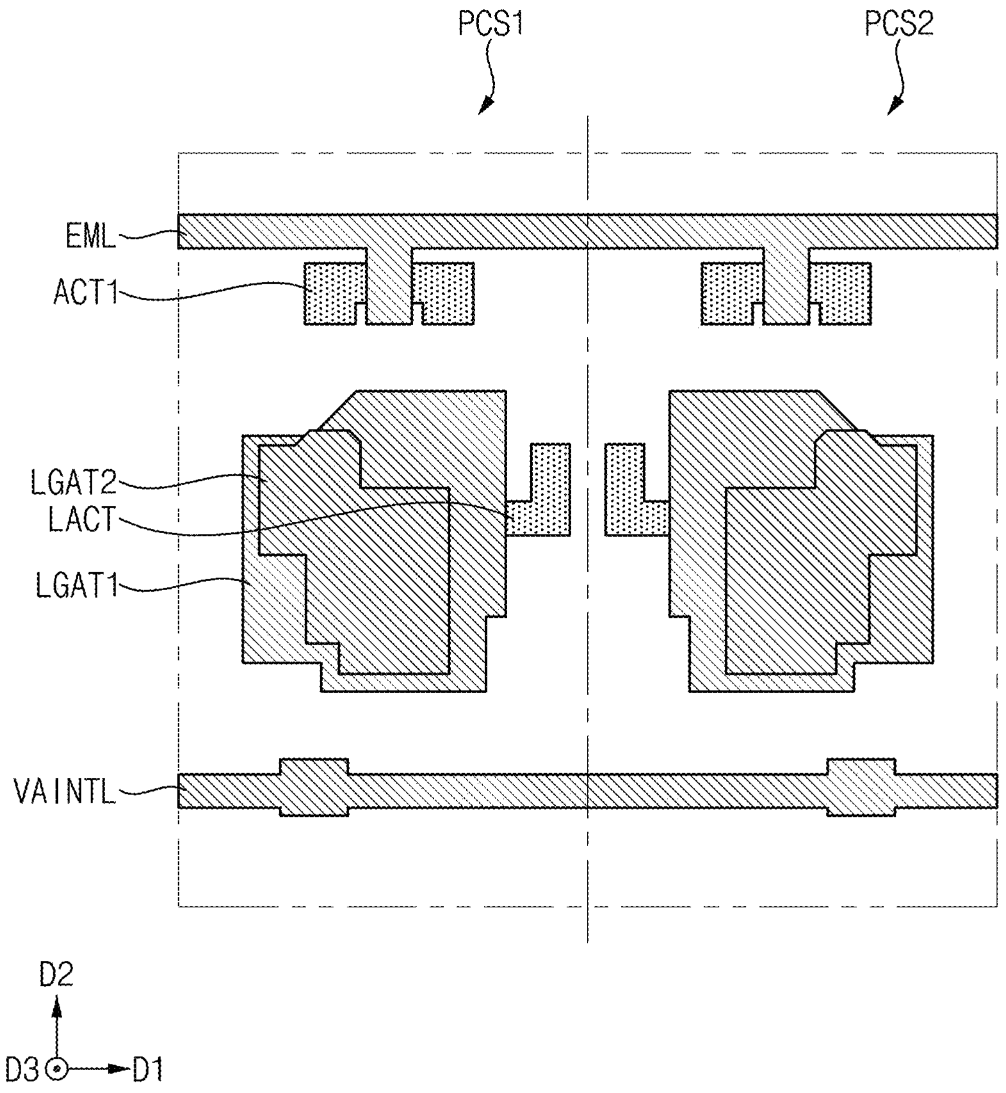

Referring to FIGS. 10, 11, and 20, a second lower gate electrode LGAT2 and an initialization voltage line VAINTL may be disposed on the second insulating layer IL2.

The second lower gate electrode LGAT2 and the initialization voltage line VAINTL may include a metal, an alloy, a metal oxide, a metal nitride, or the like. For example, the second lower gate electrode LGAT2 and the initialization voltage line VAINTL may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

In addition, each of the second lower gate electrode LGAT2 and the initialization voltage line VAINTL may include a single layer or a multilayer in combination with each other.

In an embodiment, the second lower gate electrode LGAT2 may have an island shape and may overlap the lower active pattern LACT and the first lower gate electrode LGAT1.

For example, the second lower gate electrode LGAT2 may correspond to the second terminal of the compensation capacitor CTH and to the lower gate terminal of the first transistor T1 (see FIG. 3).

In an embodiment, the initialization voltage line VAINTL may extend in the first direction D1.

For example, the initialization voltage line VAINTL may transmit the initialization voltage VAINT.

A third insulating layer IL3 may be formed on the second insulating layer IL2 and may cover the second lower gate electrode LGAT2 and the initialization voltage line VAINTL. In an embodiment, the third insulating layer IL3 may include an insulating material. For example, the third insulating layer IL3 may include silicon oxide, silicon nitride, silicon oxynitride, titanium oxide, tantalum oxide, or the like, and may have a single-layer or multi-layer structure.

Figure 12:
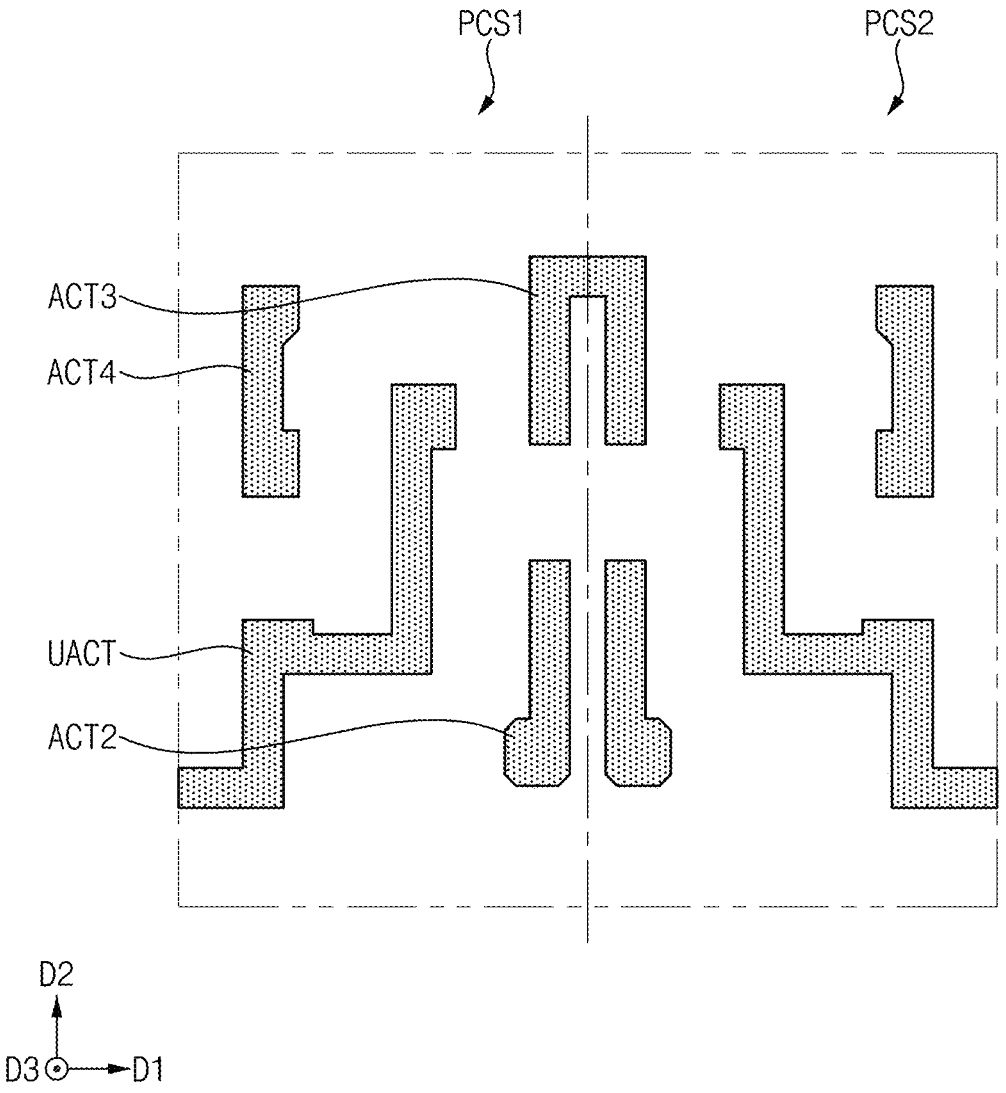
Figure 13:
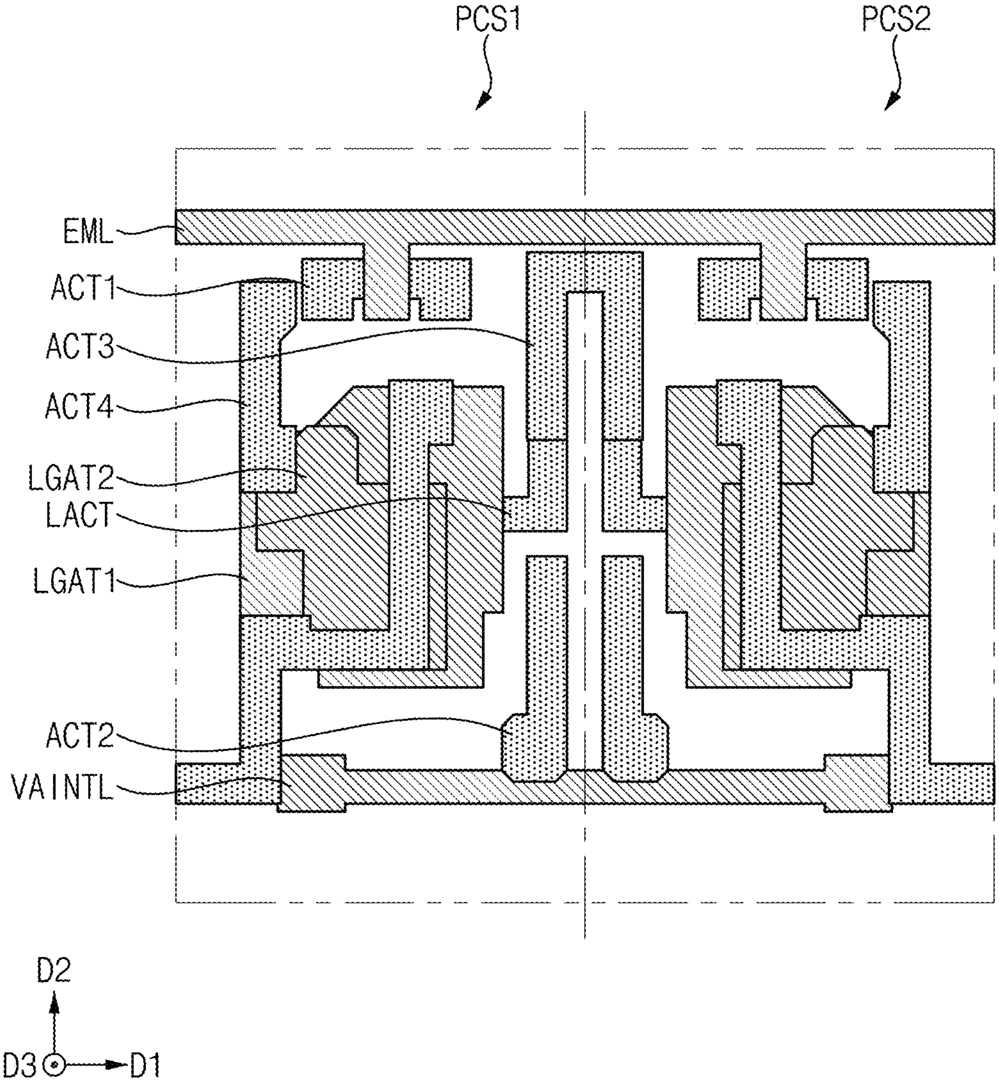

Referring to FIGS. 12, 13, and 20, an upper active pattern UACT, a second active pattern ACT2, a third active pattern ACT3, and a fourth active pattern ACT4 may be disposed on the third insulating layer IL3.

In an embodiment, the upper active pattern UACT, the second active pattern ACT2, the third active pattern ACT3, and the fourth active pattern ACT4 may include oxide semiconductor.

For example, the upper active pattern UACT, the second active pattern ACT2, the third active pattern ACT3, and the fourth active pattern ACT4 may include IGZO (InGaZnO), ITZO (InSnZnO), or the like. In addition, the upper active pattern UACT, the second active pattern ACT2, the third active pattern ACT3, and the fourth active pattern ACT4 may further include indium (In), gallium (Ga), tin (Sn), zirconium (Zr), vanadium (V), hafnium (Hf), cadmium (Cd), germanium (Ge), chromium (Cr), titanium (Ti), or zinc (Zn). These may be used alone or in combination with each other.

The upper active pattern UACT may have an island shape and may overlap the second lower gate electrode LGAT2. In addition, the upper active pattern UACT may further overlap the lower active pattern LACT and the first lower gate electrode LGAT1.

Each of the second active pattern ACT2, the third active pattern ACT3, and the fourth active pattern ACT4 may have an island shape.

A fourth insulating layer IL4 may be formed on the third insulating layer IL3 and may cover the upper active pattern UACT, the second active pattern ACT2, the third active pattern ACT3, and the fourth active pattern ACT4. In an embodiment, the fourth insulating layer IL4 may include an insulating material. For example, the fourth insulating layer IL4 may include silicon oxide, silicon nitride, silicon oxynitride, titanium oxide, tantalum oxide, or the like, and may have a single-layer or multi-layer structure.

Figure 14:
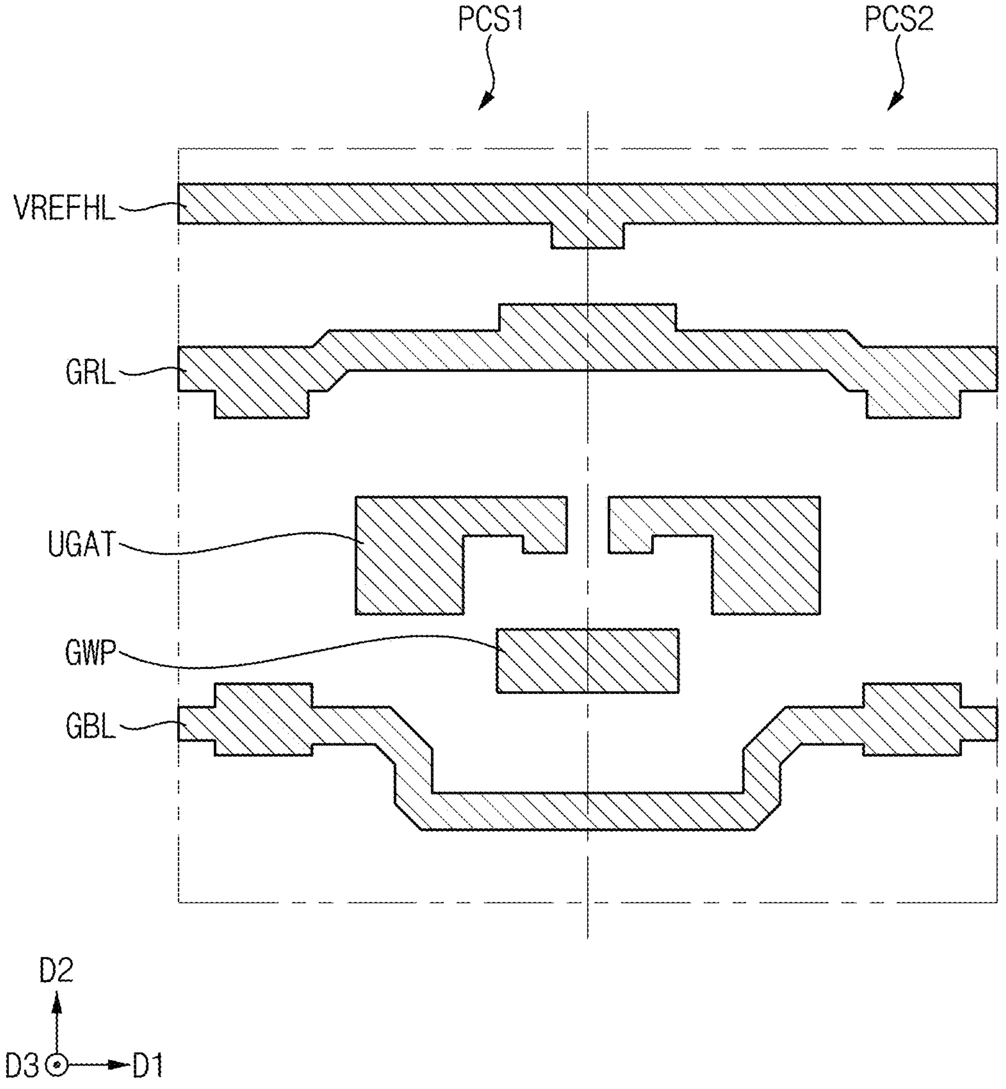
Figure 15:
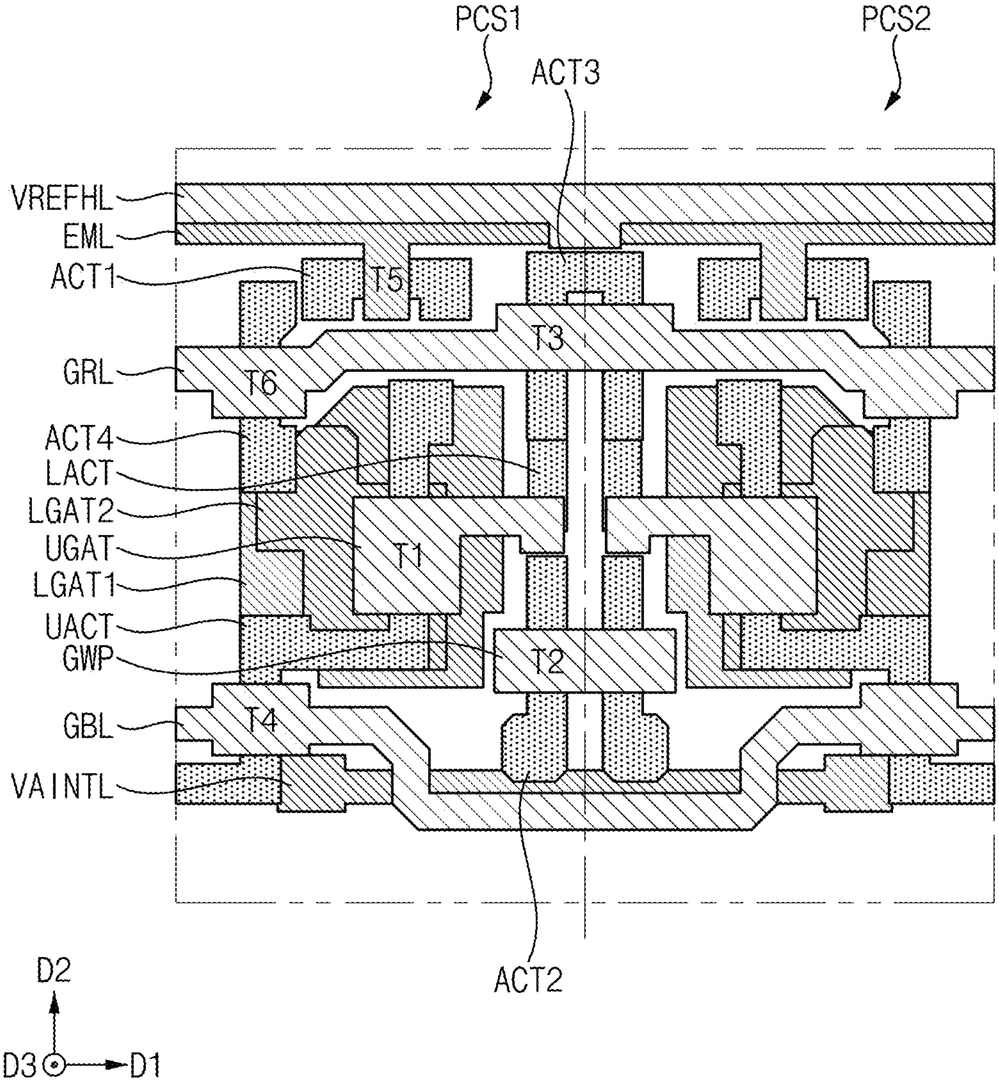

Referring to FIGS. 14, 15, and 20, a reference voltage horizontal line VREFHL, a second gate signal line GRL, an upper gate electrode UGAT, a first gate signal pattern GWP, and a third gate signal line GBL may be disposed on the fourth insulating layer IL4.

In an embodiment, the reference voltage horizontal line VREFHL, the second gate signal line GRL, the upper gate electrode UGAT, the first gate signal pattern GWP, and the third gate signal line GBL may include a metal, an alloy, a metal oxide, a metal nitride, or the like.

For example, the reference voltage horizontal line VREFHL, the second gate signal line GRL, the upper gate electrode UGAT, the first gate signal pattern GWP, and the third gate signal line GBL may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

In addition, each of the reference voltage horizontal line VREFHL, the second gate signal line GRL, the upper gate electrode UGAT, the first gate signal pattern GWP, and the third gate signal line GBL may include a single layer or a multilayer in combination with each other.

The reference voltage horizontal line VREFHL may extend in the first direction D1 and may overlap the emission control line EML.

For example, the reference voltage horizontal line VREFHL may transmit the reference voltage VREF.

The second gate signal line GRL may extend in the first direction D1 and may overlap the third active pattern ACT3 and the fourth active pattern ACT4.

For example, the second gate signal line GRL may transmit the second gate signal GR.

The third active pattern ACT3 and the second gate signal line GRL may form the third transistor T3, and the fourth active pattern ACT4 and the second gate signal line GRL may form the sixth transistor T6.

The upper gate electrode UGAT may have an island shape and may overlap the upper active pattern UACT. In addition, the upper gate electrode UGAT may overlap the lower active pattern LACT, the first lower gate electrode LGAT1, and the second lower gate electrode LGAT2.

The data voltage DATA may be applied to the upper gate electrode UGAT. The second lower gate electrode LGAT2, the upper active pattern UACT, and the upper gate electrode UGAT may form the first transistor T1 (see FIG. 3).

The area of the lower active pattern LACT may be greater than the area of the upper gate electrode UGAT. As the area of the lower active pattern LACT is formed relatively large, the capacitance of the storage capacitor CST may increase.

The area of the first lower gate electrode LGAT1 may be greater than the area of the upper gate electrode UGAT. As the area of the first lower gate electrode LGAT1 is formed relatively large, the capacitance of the storage capacitor CST and the capacitance of the compensation capacitor CTH may increase.

The area of the second lower gate electrode LGAT2 may be greater than the area of the upper gate electrode UGAT. As the area of the second lower gate electrode LGAT2 is formed relatively large, the capacitance of the compensation capacitor CTH may increase.

The first gate signal pattern GWP may have an island shape and may overlap the second active pattern ACT2.

For example, the first gate signal pattern GWP may transmit the first gate signal GW. The second active pattern ACT2 and the first gate signal pattern GWP may form the second transistor T2 (see FIG. 3).

The third gate signal line GBL may extend in the first direction D1 and may overlap the upper active pattern UACT.

For example, the third gate signal line GBL may transmit the third gate signal GB. The upper active pattern UACT and the third gate signal line GBL may form the fourth transistor T4 (see FIG. 3).

A fifth insulating layer IL5 may be formed on the fourth insulating layer IL4 and may cover the reference voltage horizontal line VREFHL, the second gate signal line GRL, the upper gate electrode UGAT, the first gate signal pattern GWP, and the third gate signal line GBL. In an embodiment, the fifth insulating layer IL5 may include an insulating material. For example, the fifth insulating layer IL5 may include an organic insulating material such as a photoresist, a polyacrylic resin, a polyimide resin, or an acrylic resin.

Figure 16:
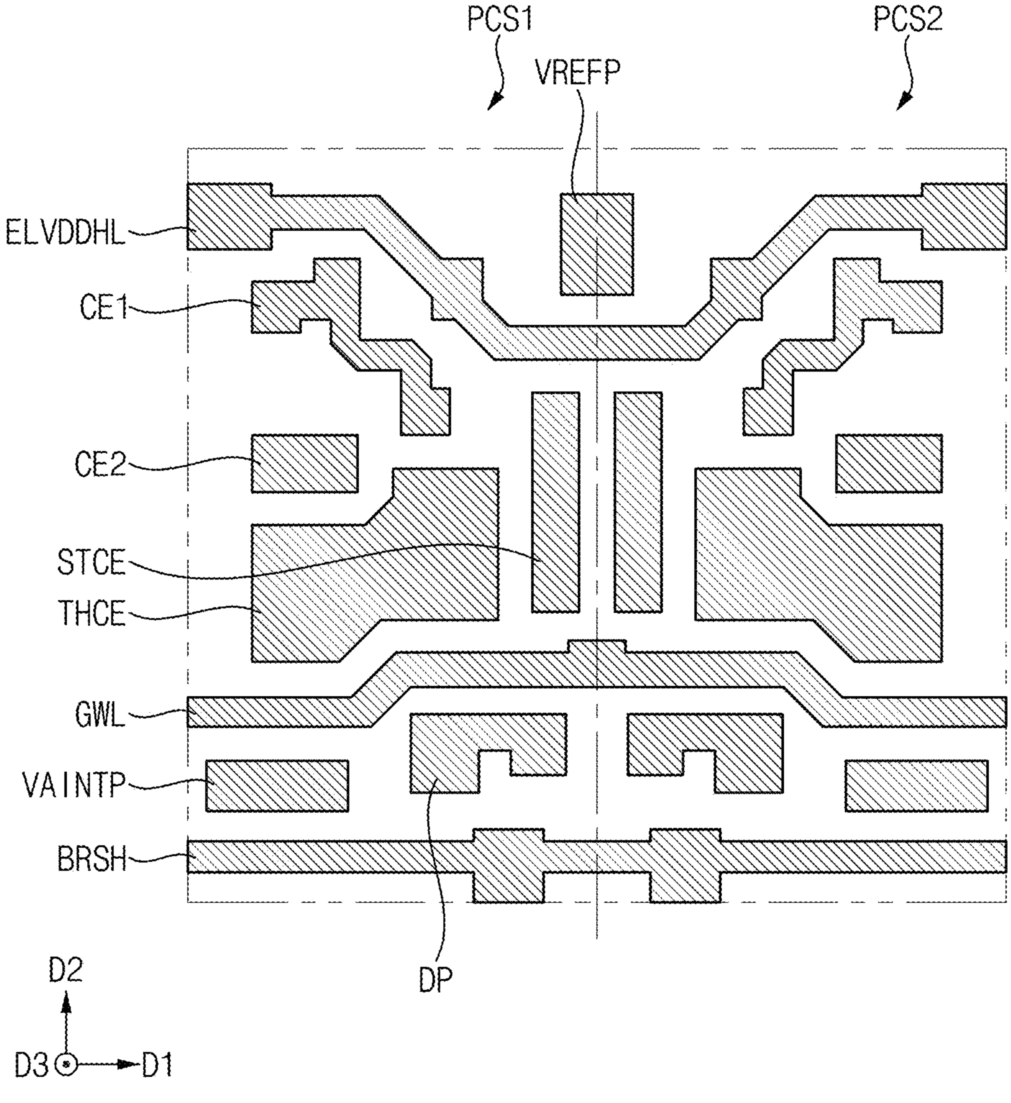
Figure 17:
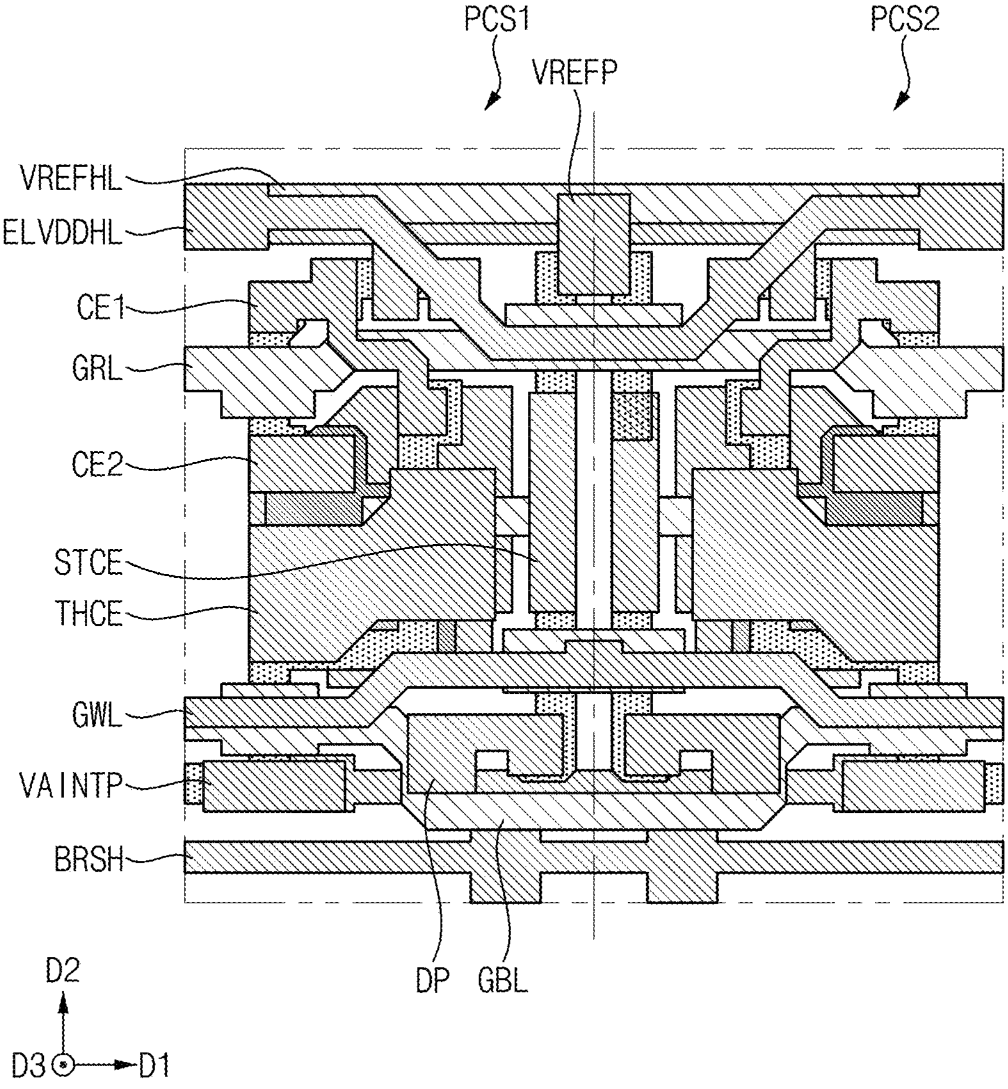

Referring to FIGS. 16, 17, and 20, a reference voltage pattern VREFP, a high power voltage horizontal line ELVDDHL, a first connection electrode CE1, a second connection electrode CE2, a storage connection electrode STCE, a compensation connection electrode THCE, a first gate signal line GWL, a data voltage connection pattern DP, an initialization voltage connection pattern VAINTP, and a data voltage horizontal connection line BRSH may be disposed on the fifth insulating layer IL5.

In an embodiment, the reference voltage pattern VREFP, the high power voltage horizontal line ELVDDHL, the first connection electrode CE1, the second connection electrode CE2, the storage connection electrode STCE, the compensation connection electrode THCE, the first gate signal line GWL, the data voltage connection pattern DP, the initialization voltage connection pattern VAINTP, and the data voltage horizontal connection line BRSH may include a metal, an alloy, a metal oxide, a metal nitride, or the like.

For example, the reference voltage pattern VREFP, the high power voltage horizontal line ELVDDHL, the first connection electrode CE1, the second connection electrode CE2, the storage connection electrode STCE, the compensation connection electrode THCE, the first gate signal line GWL, the data voltage connection pattern DP, the initialization voltage connection pattern VAINTP, and the data voltage horizontal connection line BRSH may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

In addition, each of the reference voltage pattern VREFP, the high power voltage horizontal line ELVDDHL, the first connection electrode CE1, the second connection electrode CE2, the storage connection electrode STCE, the compensation connection electrode THCE, the first gate signal line GWL, the data voltage connection pattern DP, the initialization voltage connection pattern VAINTP, and the data voltage horizontal connection line BRSH may include a single layer or a multilayer in combination with each other.

The reference voltage pattern VREFP may have an island shape and may contact the reference voltage horizontal line VREFHL and the third active pattern ACT3.

For example, the reference voltage pattern VREFP may transmit the reference voltage VREF to the third active pattern ACT3.

The high power voltage horizontal line ELVDDHL may extend in the first direction D1 and may contact the first active pattern ACT1.

For example, the high power voltage horizontal line ELVDDHL may transmit the high power voltage ELVDD to the first active pattern ACT1.

The first connection electrode CE1 may have an island shape and may contact the first active pattern ACT1, the upper active pattern UACT, and the fourth active pattern ACT4.

The second connection electrode CE2 may have an island shape and may contact the second lower gate electrode LGAT2 and the fourth active pattern ACT4.

The storage connection electrode STCE may have an island shape and may contact the lower active pattern LACT, the second active pattern ACT2, the third active pattern ACT3, and the upper gate electrode UGAT.

For example, the storage connection electrode STCE may contact the lower active pattern LACT and the upper gate electrode UGAT. In other words, the upper gate electrode UGAT may be electrically connected to the lower active pattern LACT through the storage connection electrode STCE.

The compensation connection electrode THCE may have an island shape and may contact the first lower gate electrode LGAT1 and the upper active pattern UACT.

For example, the upper active pattern UACT may be electrically connected to the first lower gate electrode LGAT1 through the compensation connection electrode THCE.

The first gate signal line GWL may extend in the first direction D1 and may contact the first gate signal pattern GWP.

For example, the first gate signal line GWL may transmit the first gate signal GW to the first gate signal pattern GWP.

The data voltage connection pattern DP may have an island shape and may contact the second active pattern ACT2.

For example, the data voltage connection pattern DP may transmit the data voltage DATA to the second active pattern ACT2.

the initialization voltage connection pattern VAINTP may have an island shape and may contact the upper active pattern UACT.

For example, the initialization voltage connection pattern VAINTP may transmit the initialization voltage VAINT to the upper active pattern UACT.

the data voltage horizontal connection line BRSH may extend in the first direction D1.

A sixth insulating layer IL6 may be formed on the fifth insulating layer IL5 and may cover the reference voltage pattern VREFP, the high power voltage horizontal line ELVDDHL, the first connection electrode CE1, the second connection electrode CE2, the storage connection electrode STCE, the compensation connection electrode THCE, the first gate signal line GWL, the data voltage connection pattern DP, the initialization voltage connection pattern VAINTP, and the data voltage horizontal connection line BRSH. In an embodiment, the sixth insulating layer IL6 may include an insulating material. For example, the sixth insulating layer IL6 may include an organic insulating material such as a photoresist, a polyacrylic resin, a polyimide resin, or an acrylic resin.

Figure 18:
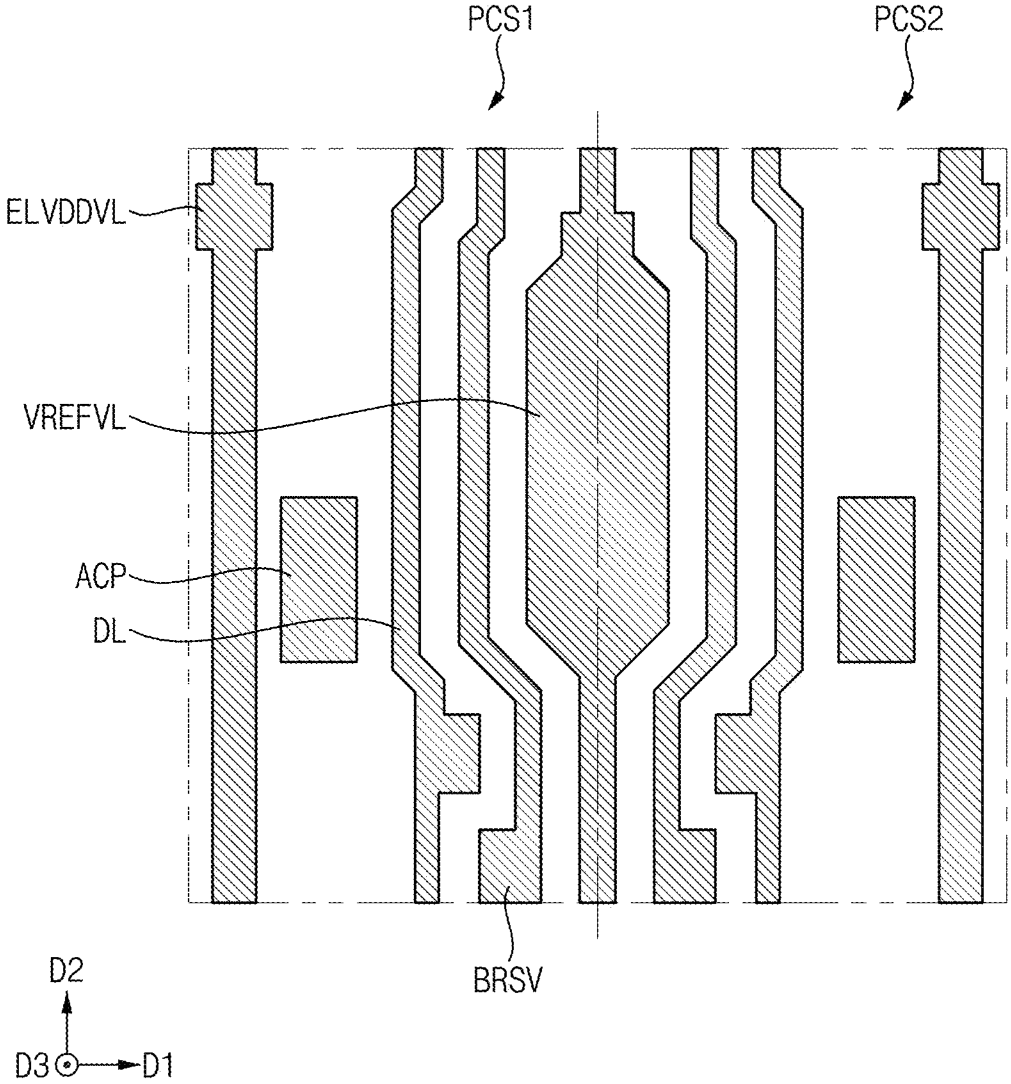
Figure 19:
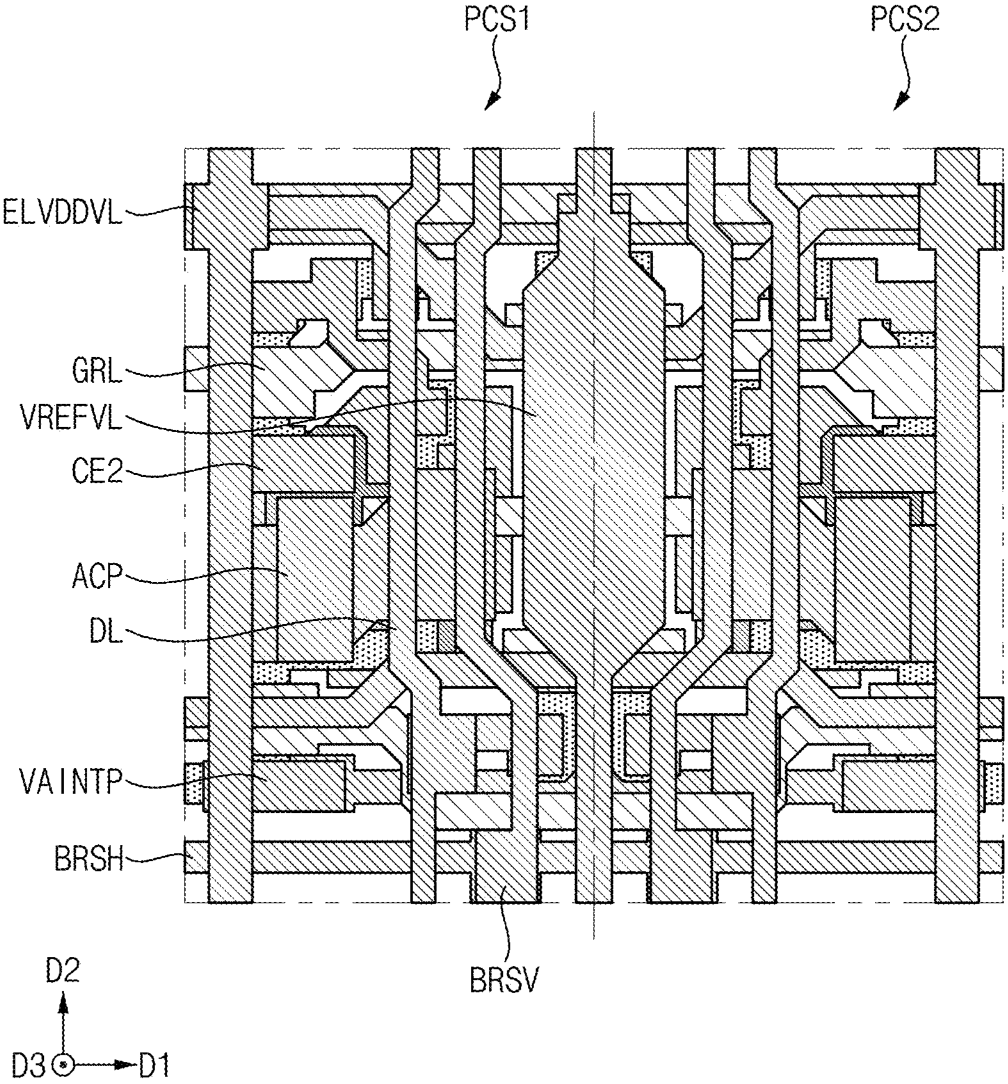
Figure 20:
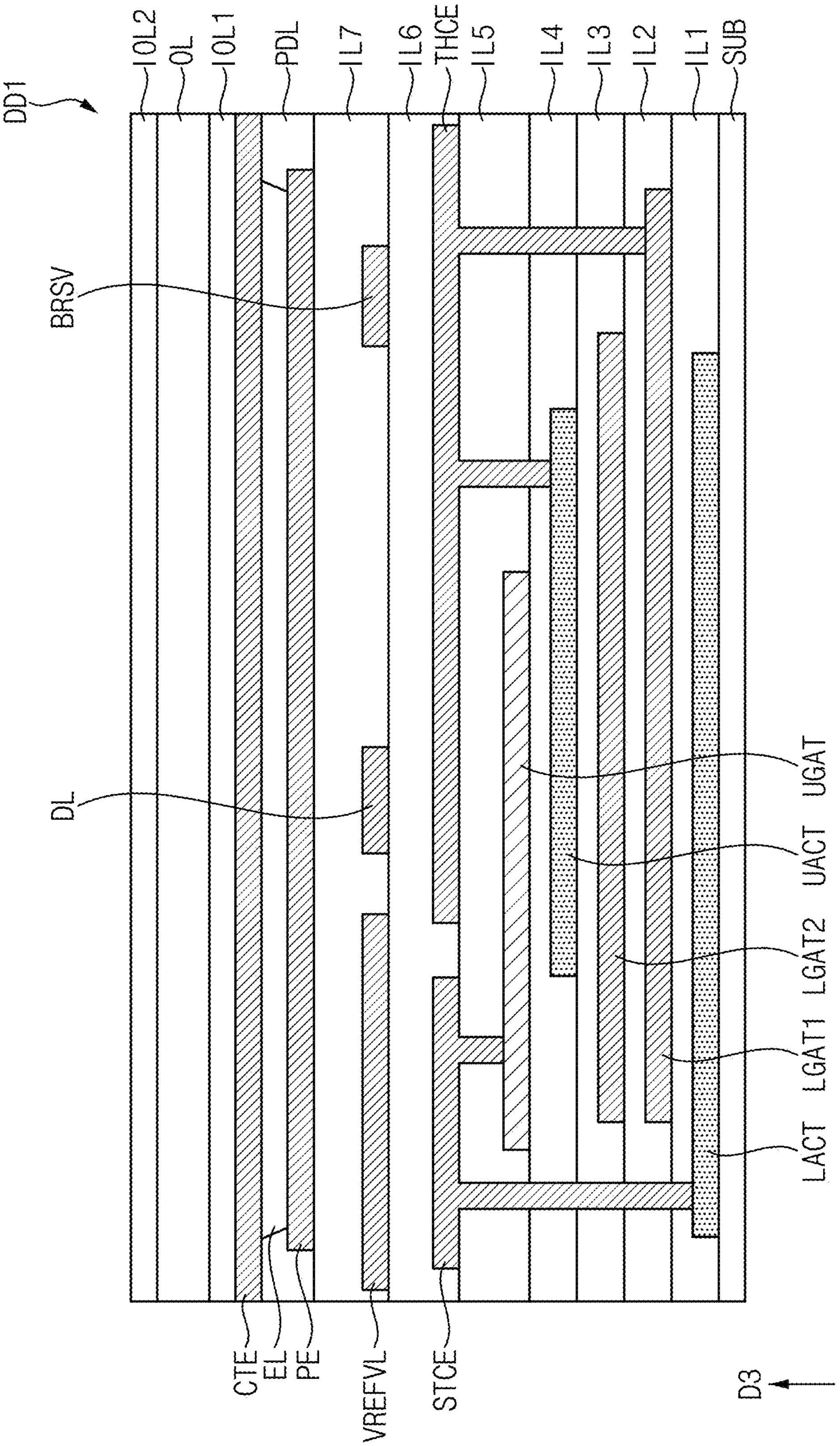
FIG. 20 is a cross-sectional view illustrating the display device of FIG. 1.

Referring to FIGS. 18, 19, and 20, the high power voltage vertical line ELVDDVL, a pixel connection pad ACP, a data line DL, a data voltage vertical connection line BRSV, and a reference voltage vertical line VREFVL may be disposed on the sixth insulating layer IL6.

In an embodiment, the high power voltage vertical line ELVDDVL, the pixel connection pad ACP, the data line DL, the data voltage vertical connection line BRSV, and the reference voltage vertical line VREFVL may include a metal, an alloy, a metal oxide, a metal nitride, or the like.

For example, the high power voltage vertical line ELVDDVL, the pixel connection pad ACP, the data line DL, the data voltage vertical connection line BRSV, and the reference voltage vertical line VREFVL may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

In addition, the high power voltage vertical line ELVDDVL, the pixel connection pad ACP, the data line DL, the data voltage vertical connection line BRSV, and the reference voltage vertical line VREFVL may include a single layer or a multilayer in combination with each other.

The high power voltage vertical line ELVDDVL may extend in the second direction D2 and may contact the high power voltage horizontal line ELVDDHL.

For example, the high power voltage vertical line ELVDDVL may transmit the high power voltage ELVDD to the high power voltage horizontal line ELVDDHL.

The pixel connection pad ACP may have an island shape and may contact the compensation connection electrode THCE.

The data line DL may extend in the second direction D2 and may contact the data voltage connection pattern DP.

For example, the data line DL may transmit the data voltage DATA to the data voltage connection pattern DP.

The compensation connection electrode THCE may be disposed between the upper gate electrode UGAT and the data line DL, and may overlap the upper gate electrode UGAT and the data line DL. Accordingly, the compensation connection electrode THCE may shield the upper gate electrode UGAT from the data line DL.

The data voltage vertical connection line BRSV may extend in the second direction D2 and may contact the data voltage horizontal connection line BRSH.

The reference voltage vertical line VREFVL may extend in the second direction D2 and may contact the reference voltage pattern VREFP.

For example, the reference voltage vertical line VREFVL may transmit the reference voltage VREF to the reference voltage pattern VREFP.

The reference voltage vertical line VREFVL may overlap the storage connection electrode STCE. Accordingly, the reference voltage vertical line VREFVL may shield the storage connection electrode STCE.

A seventh insulating layer IL7 may be formed on the sixth insulating layer IL6 and may cover the high power voltage vertical line ELVDDVL, the pixel connection pad ACP, the data line DL, the data voltage vertical connection line BRSV, and the reference voltage vertical line VREFVL. In an embodiment, the seventh insulating layer IL7 may include an insulating material. For example, the seventh insulating layer IL7 may include an organic insulating material such as a photoresist, a polyacrylic resin, a polyimide resin, or an acrylic resin.

A pixel electrode PE may be disposed on the seventh insulating layer IL7.

In an embodiment, the pixel electrode PE may include a metal, an alloy, a metal oxide, a metal nitride, or the like. For example, the pixel electrode PE may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

In addition, the pixel electrode PE may include a single layer or a multilayer in combination with each other.

A pixel defining layer PDL may be disposed on the seventh insulating layer IL7, and an opening may be formed in the pixel defining layer PDL to extend to the pixel electrode PE.

For example, the pixel defining layer PDL may include organic materials such as polyimide-based resin (e.g., photosensitive polyimide-based resin (PSPI)), photoresist, polyacrylic-based resin or acrylic resin, or inorganic materials such as silicon oxide or silicon nitride.

The emission layer EL may be disposed on the pixel electrode PE. In an embodiment, the emission layer EL may have a multilayer structure including an organic light-emitting layer, a hole injection layer, a hole transport layer, an electron transport layer, and an electron injection layer.

The common electrode CTE may be disposed on the emission layer EL.

In an embodiment, the common electrode CTE may include a metal, an alloy, a conductive metal oxide, or the like. For example, the common electrode CTE may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like. These may be used alone or in combination with each other.

A first encapsulating inorganic layer IOL1 may be disposed on the common electrode CTE and may include an inorganic material.

An organic encapsulating layer OL may be disposed on the first encapsulating inorganic layer IOL1 and may include an organic material.

As second encapsulating inorganic layer IOL2 may be disposed on the organic encapsulating layer OL and may include an inorganic material.

The first inorganic encapsulating layer IOL1, the organic encapsulating layer OL, and the second inorganic encapsulating layer IOL2 may protect the emission layer EL from moisture or oxygen permeated from outside.

Referring further to FIG. 20, the storage connection electrode STCE may contact the upper gate electrode UGAT and the lower active pattern LACT. The upper gate electrode UGAT may correspond to the gate terminal of the first transistor T1. The lower active pattern LACT may be electrically connected to the upper gate electrode UGAT and may correspond to the first terminal of the storage capacitor CST.

The compensation connection electrode THCE may contact a portion of the upper active pattern UACT and the first lower gate electrode LGAT1. The portion of the upper active pattern UACT may correspond to the second terminal of the first transistor T1. The first lower gate electrode LGAT1 may be electrically connected to the portion of the upper active pattern UACT, and may correspond to the second terminal of the storage capacitor CST and to the first terminal of the compensation capacitor CTH.

The lower active pattern LACT, the first lower gate electrode GATI, and the second lower gate electrode LGAT2 may be disposed on different layers and may overlap each other. Accordingly, as described above, the areas of each of the lower active pattern LACT, the first lower gate electrode LGAT1, and the second lower gate electrode LGAT2 may be formed relatively greater than the area of the upper gate electrode UGAT, securing sufficient capacitances of the storage capacitor CST and the compensation capacitor CTH.

As the area of each of the lower active pattern LACT and the first lower gate electrode LGAT1 is sufficiently secured, the capacitance of the storage capacitor CST formed by the lower active pattern LACT and the first lower gate electrode LGAT1 may increase.

As the area of each of the first lower gate electrode LGAT1 and the second lower gate electrode LGAT2 is sufficiently secured, the capacitance of the compensation capacitor CTH formed by the first lower gate electrode LGAT1 and the second lower gate electrode LGAT2 may increase.

Figure 21:
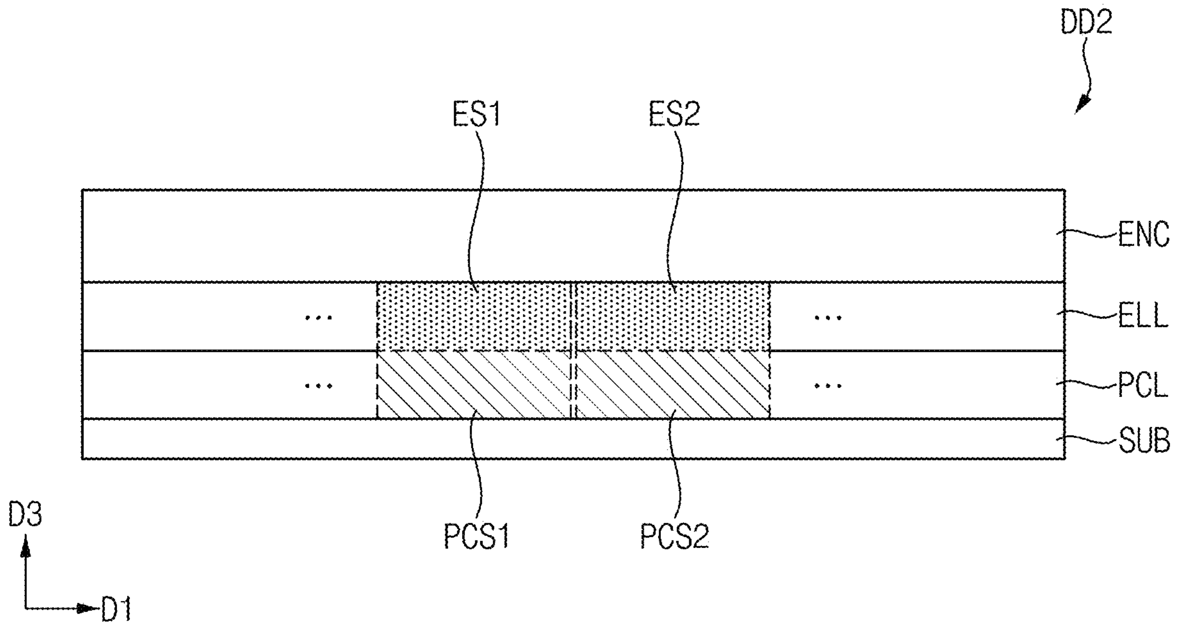
FIG. 21 is a cross-sectional view illustrating a display device according to an embodiment of the present disclosure.
Figure 22:
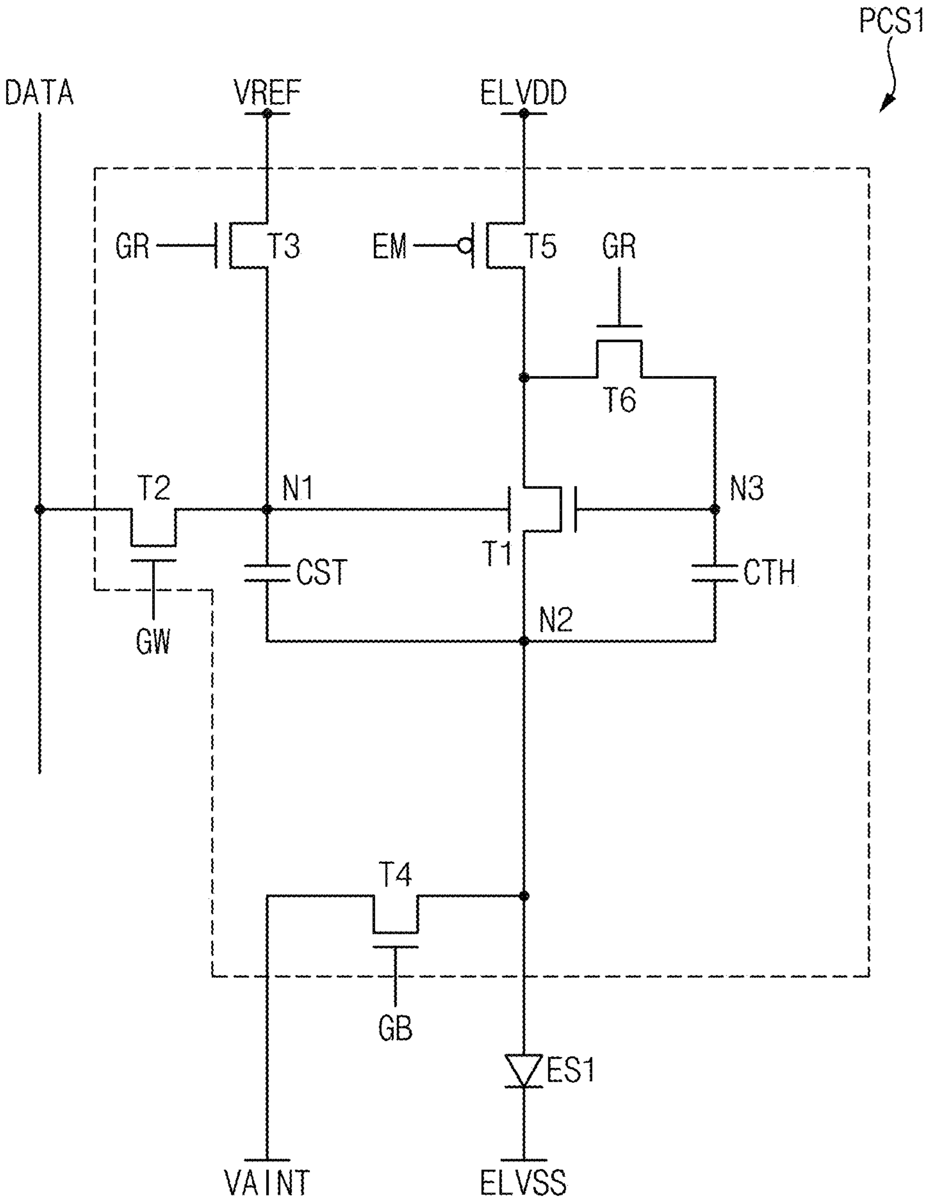
FIG. 22 is a circuit diagram illustrating a pixel circuit structure included in the display device of FIG. 21.
Figure 23:
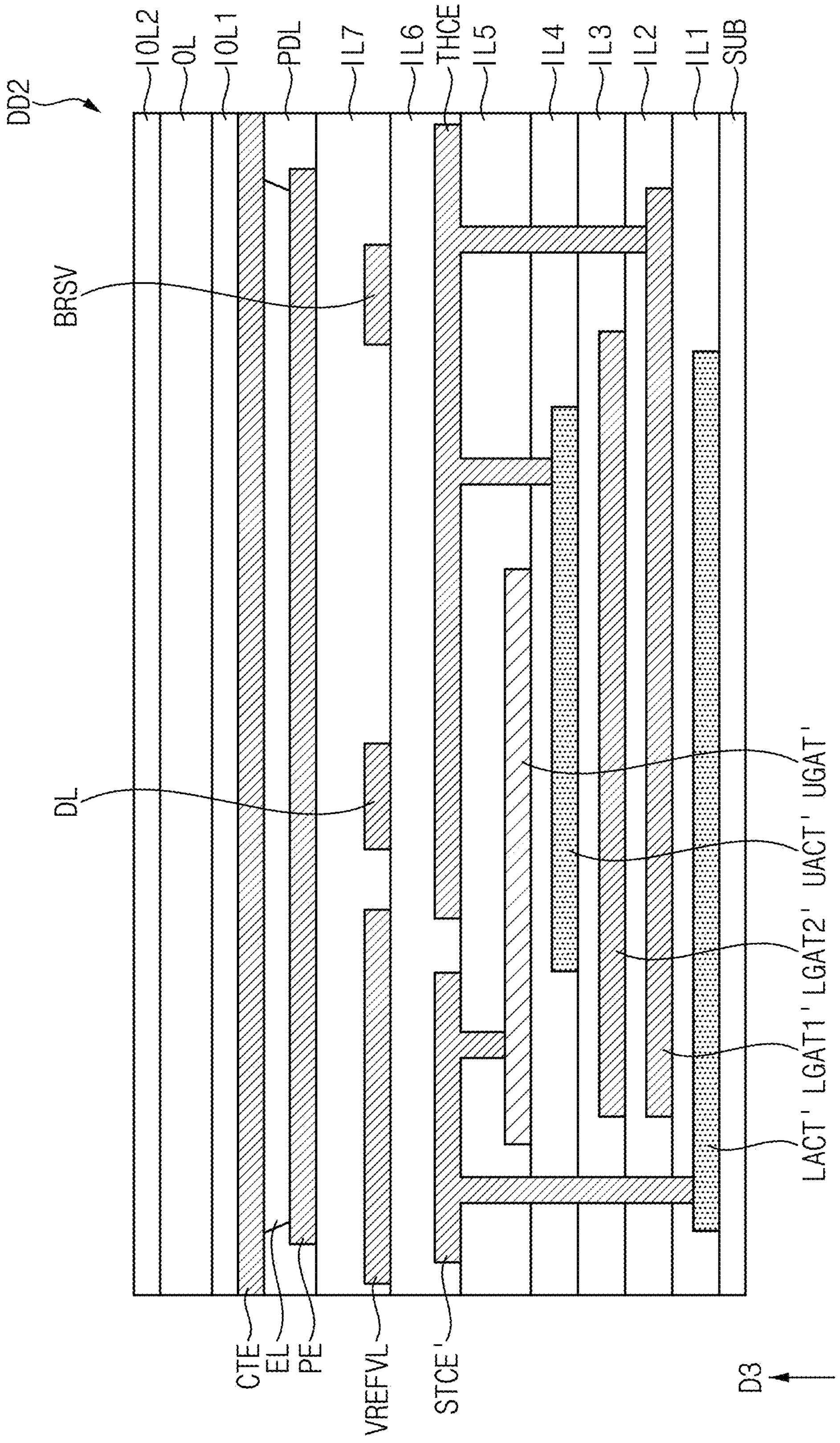
FIG. 23 is a cross-sectional view illustrating the display device of FIG. 21.

FIG. 21 is a cross-sectional view illustrating a display device according to an embodiment of the present disclosure. FIG. 22 is a circuit diagram illustrating a pixel circuit structure included in the display device of FIG. 21. FIG. 23 is a cross-sectional view illustrating the display device of FIG. 21.

Referring to FIG. 21, a display device DD2 according to an embodiment of the present disclosure may include a substrate SUB, a pixel circuit layer PCL, a light emitting layer ELL, and an encapsulation layer ENC.

The pixel circuit layer PCL may include at least one pixel circuit structure. For example, the pixel circuit layer PCL may include a first pixel circuit structure PCS1 and a second pixel circuit structure PCS2.

The light emitting layer ELL may include at least one light emitting structure. For example, the light emitting layer ELL may include a first light emitting structure ES1 and a second light emitting structure ES2.

The pixel circuit layer PCL may be disposed on the substrate SUB.

The first pixel circuit structure PCS1 and the second pixel circuit structure PCS2 may be arranged side by side along the first direction D1. Each of the first and second pixel circuit structures PCS1 and PCS2 may receive a signal or voltage and generate a driving current.

The light emitting layer ELL may be disposed on the pixel circuit layer PCL.

The first and second light emitting structures ES1 and ES2 may be electrically connected to the first and second pixel circuit structures PCS1 and PCS2, respectively. The first light emitting structure ES1 may receive a driving current from the first pixel circuit structure PCS1 and may emit light. The second light emitting structure ES2 may receive a driving current from the second pixel circuit structure PCS2 and may emit light.

The encapsulating layer ENC may be disposed on the light emitting layer ELL. The encapsulating layer ENC may encapsulate the light emitting layer ELL.

The display device DD2 may be substantially the same as the display device DD1 described above with reference to FIG. 1, except for the first and second pixel circuit structures PCS1 and PCS2.

Referring to FIG. 22, the first pixel circuit structure PCS1 may provide a driving current to the first light emitting structure ES1. The first pixel circuit structure PCS1 may include a first transistor T1, a second transistor T2, a third transistor T3, a fourth transistor T4, a fifth transistor T5, a sixth transistor T6, a storage capacitor CST, and a compensation capacitor CTH.

The first transistor T1 may include a gate terminal, a lower gate terminal, a first terminal, and a second terminal.

The gate terminal of the first transistor T1 may be electrically connected to the compensation capacitor CTH through a third node N3.

The lower gate terminal of the first transistor T1 may be electrically connected to the second transistor T2 and the storage capacitor CST through a first node N1. The data voltage DATA may be applied to the lower gate terminal.

The first terminal of the first transistor T1 may be electrically connected to the fifth transistor T5 and the sixth transistor T6.

The second terminal of the first transistor T1 may be electrically connected to the fourth transistor T4 and the first light emitting structure ES1 through a second node N2.

According to an embodiment, the first transistor T1 may have a back-gate structure in which the data voltage DATA is applied to the lower gate terminal.

The first transistor T1 may generate a driving current based on a high power voltage ELVDD and the data voltage DATA. For example, the first transistor T1 may be referred to as a driving transistor.

The second to sixth transistors T2, T3, T4, T5, and T6 may be substantially the same as the second to sixth transistors T2, T3, T4, T5, and T6 described above with reference to FIG. 3.

The storage capacitor CST may include a first terminal and a second terminal.

The first terminal of the storage capacitor CST may be electrically connected to the first node N1.

The second terminal of the storage capacitor CST may be electrically connected to the second node N2.

The compensation capacitor CTH may include a first terminal and a second terminal.

The first terminal of the compensation capacitor CTH may be electrically connected to the second node N2.

The second terminal of the compensation capacitor CTH may be electrically connected to the third node N3.

Referring to FIG. 23, the display device DD2 may include a lower active pattern LACT', a first lower gate electrode LGAT1', a second lower gate electrode LGAT2', an upper active pattern UACT', an upper gate electrode UGAT', a storage connection electrode STCE', a compensation connection electrode THCE', a reference voltage vertical line VREFVL, a data line DL, a data voltage vertical line BRSV, a pixel electrode PE, an emission layer EL, and a common electrode CTE.

The display device DD2 may be substantially the same as the display device DD1 described above, except for the lower active pattern LACT', the first lower gate electrode LGAT1', the second lower gate electrode LGAT2', the upper active pattern UACT', the upper gate electrode UGAT', the storage connection electrode STCE', and the compensation connection electrode THCE'.

The lower active pattern LACT' may be disposed on the substrate SUB. In an embodiment, the lower active pattern LACT' may include a silicon semiconductor.

For example, the lower active pattern LACT' may correspond to the second terminal of the compensation capacitor CTH (see FIG. 22).

The first lower gate electrode LGAT1' may be disposed on the first insulating layer IL1.

In an embodiment, the first lower gate electrode LGAT1' may have an island shape and may overlap the lower active pattern LACT'.

For example, the first lower gate electrode LGAT1' may correspond to the second terminal of the storage capacitor CST (see FIG. 22). In addition, the first lower gate electrode LGAT1' may correspond to the first terminal of the compensation capacitor CTH (see FIG. 22).

The second lower gate electrode LGAT2' may be disposed on the second insulating layer IL2.

In an embodiment, the second lower gate electrode LGAT2' may have an island shape and may overlap the lower active pattern LACT' and the first lower gate electrode LGAT1'.

For example, the second lower gate electrode LGAT2' may correspond to the first terminal of the storage capacitor CST and the lower gate terminal of the first transistor T1 (see FIG. 22).

The upper active pattern UACT' may be disposed on the third insulating layer IL3. In an embodiment, the upper active pattern UACT' may include an oxide semiconductor.

In an embodiment, the upper active pattern UACT' may have an island shape and may overlap the second lower gate electrode LGAT2'. In addition, the upper active pattern UACT' may further overlap the lower active pattern LACT' and the first lower gate electrode LGAT1'.

The upper gate electrode UGAT' may be disposed on the fourth insulating layer IL4.

In an embodiment, the upper gate electrode UGAT' may have an island shape and may overlap the upper active pattern UACT'. In addition, the upper gate electrode UGAT' may overlap the lower active pattern LACT', the first lower gate electrode LGAT1', and the second lower gate electrode LGAT2'.

The data voltage DATA may be applied to the second lower gate electrode LGAT2'. The second lower gate electrode LGAT2', the upper active pattern UACT', and the upper gate electrode UGAT' may form the first transistor T1 (see FIG. 22).

In an embodiment, the area of the lower active pattern LACT' may be greater than the area of the upper gate electrode UGAT'. As the area of the lower active pattern LACT' is formed relatively large, the capacitance of the compensation capacitor CTH may increase.

In an embodiment, the area of the first lower gate electrode LGAT1' may be greater than the area of the upper gate electrode UGAT'. As the area of the first lower gate electrode LGAT1' is formed relatively large, the capacitance of the storage capacitor CST and the capacitance of the compensation capacitor CTH may increase.

In an embodiment, the area of the second lower gate electrode LGAT2' may be greater than the area of the upper gate electrode UGAT'. As the area of the second lower gate electrode LGAT2' is formed relatively large, the capacitance of the storage capacitor CST may increase.

The storage connection electrode STCE and the compensation connection electrode THCE may be disposed on the fifth insulating layer IL5.

In an embodiment, the storage connection electrode STCE' may have an island shape and may contact the lower active pattern LACT' and the upper gate electrode UGAT'.

For example, the storage connection electrode STCE' may contact the lower active pattern LACT' and the upper gate electrode UGAT'. In other words, the upper gate electrode UGAT' may be electrically connected to the lower active pattern LACT' through the storage connection electrode STCE'.

In an embodiment, the compensation connection electrode THCE' may have an island shape and may contact the first lower gate electrode LGAT1' and the upper active pattern UACT'.

For example, the upper active pattern UACT' may be electrically connected to the first lower gate electrode LGAT1' through the compensation connection electrode THCE'.

Figure 24:
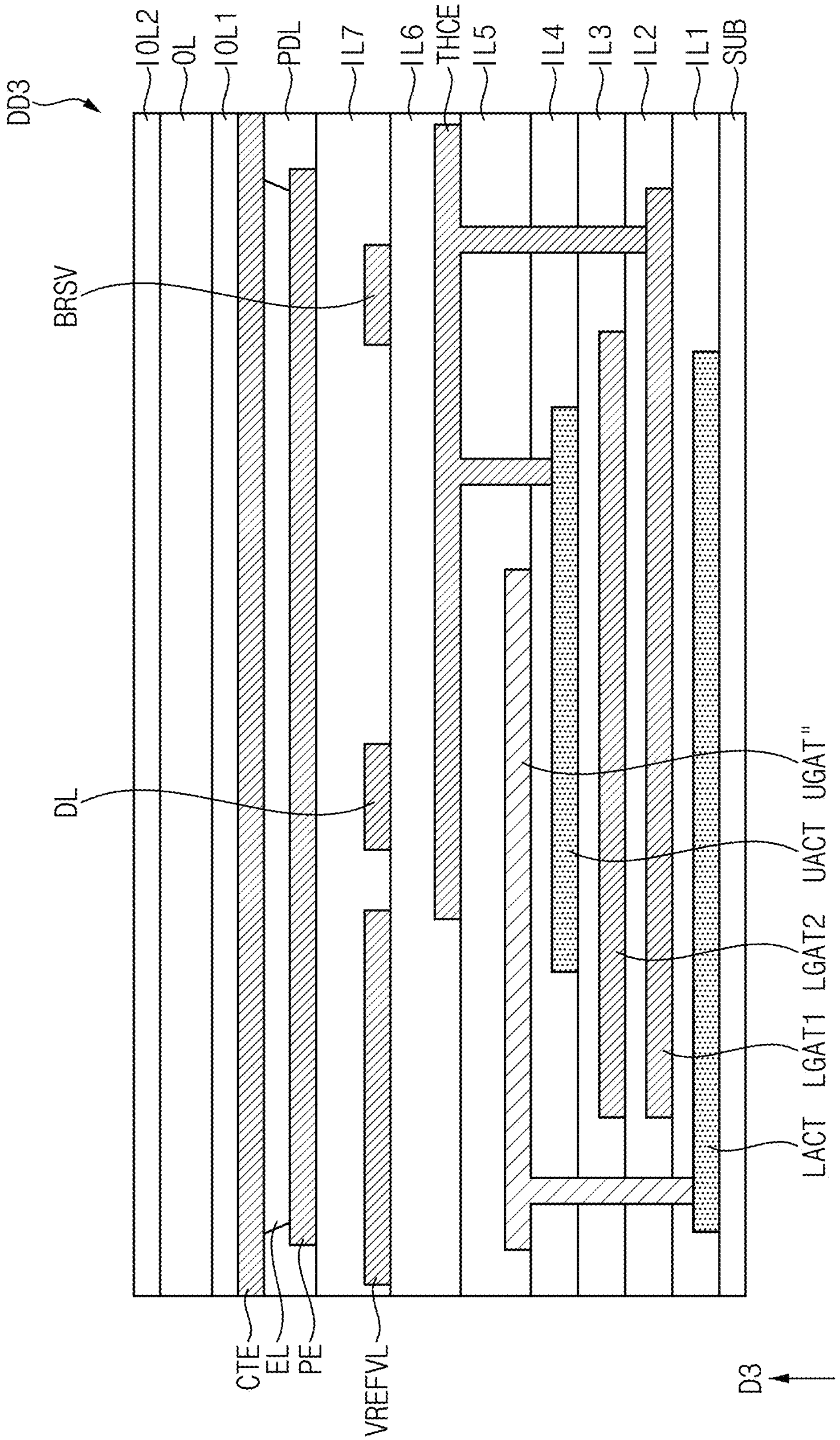
FIG. 24 is a cross-sectional view illustrating a display device according to an embodiment of the present disclosure.

FIG. 24 is a cross-sectional view illustrating a display device according to an embodiment of the present disclosure.

Referring to FIG. 24, a display device DD3 according to an embodiment of the present disclosure may include a lower active pattern LACT, a first lower gate electrode LGAT1, a second lower gate electrode LGAT2, an upper active pattern UACT, an upper gate electrode UGAT", a compensation connection electrode THCE, a reference voltage vertical line VREFVL, a data line DL, a data voltage vertical connection line BRSV, a pixel electrode PE, an emission layer EL, and a common electrode CTE.

The display device DD3 may be substantially the same as the display device DD1 described above, except for the upper gate electrode UGAT".

The upper gate electrode UGAT" may be disposed on the fourth insulating layer IL4.

According to an embodiment, the upper gate electrode UGAT" may have an island shape and may directly contact the lower active pattern LACT. In other words, the display device DD3 may not include a separate storage connection electrode (for example, the storage connection electrode STCE of FIG. 20), and the lower active pattern LACT may be directly connected to the upper gate electrode UGAT".

Figure 25:
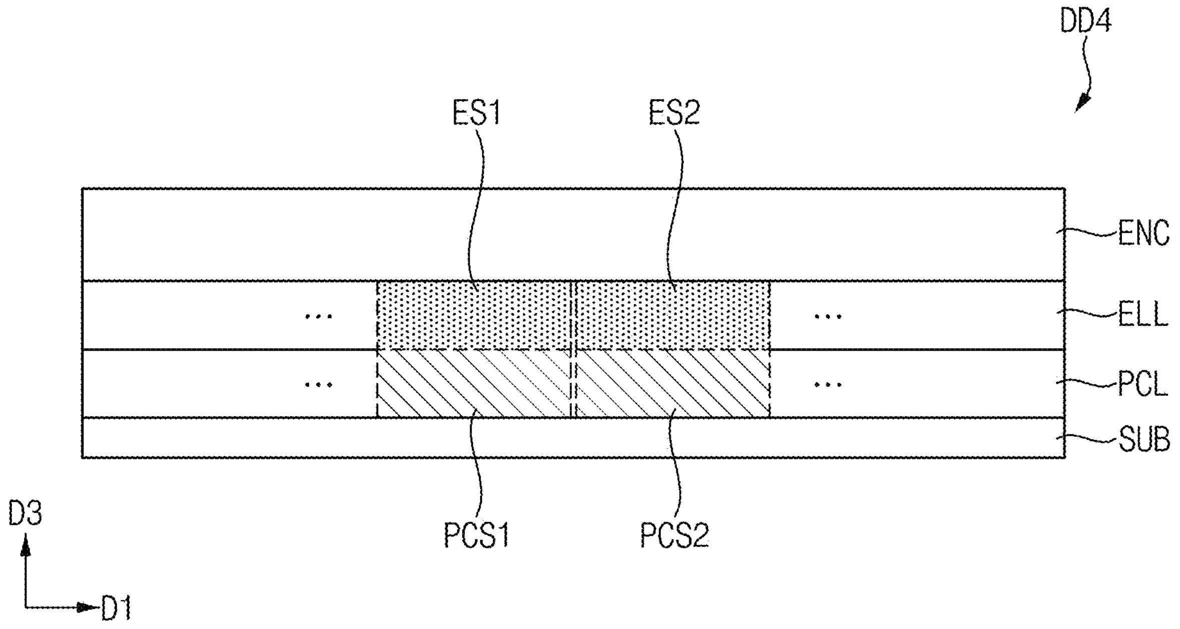
FIG. 25 is a cross-sectional view illustrating a display device according to an embodiment of the present disclosure.
Figure 26:
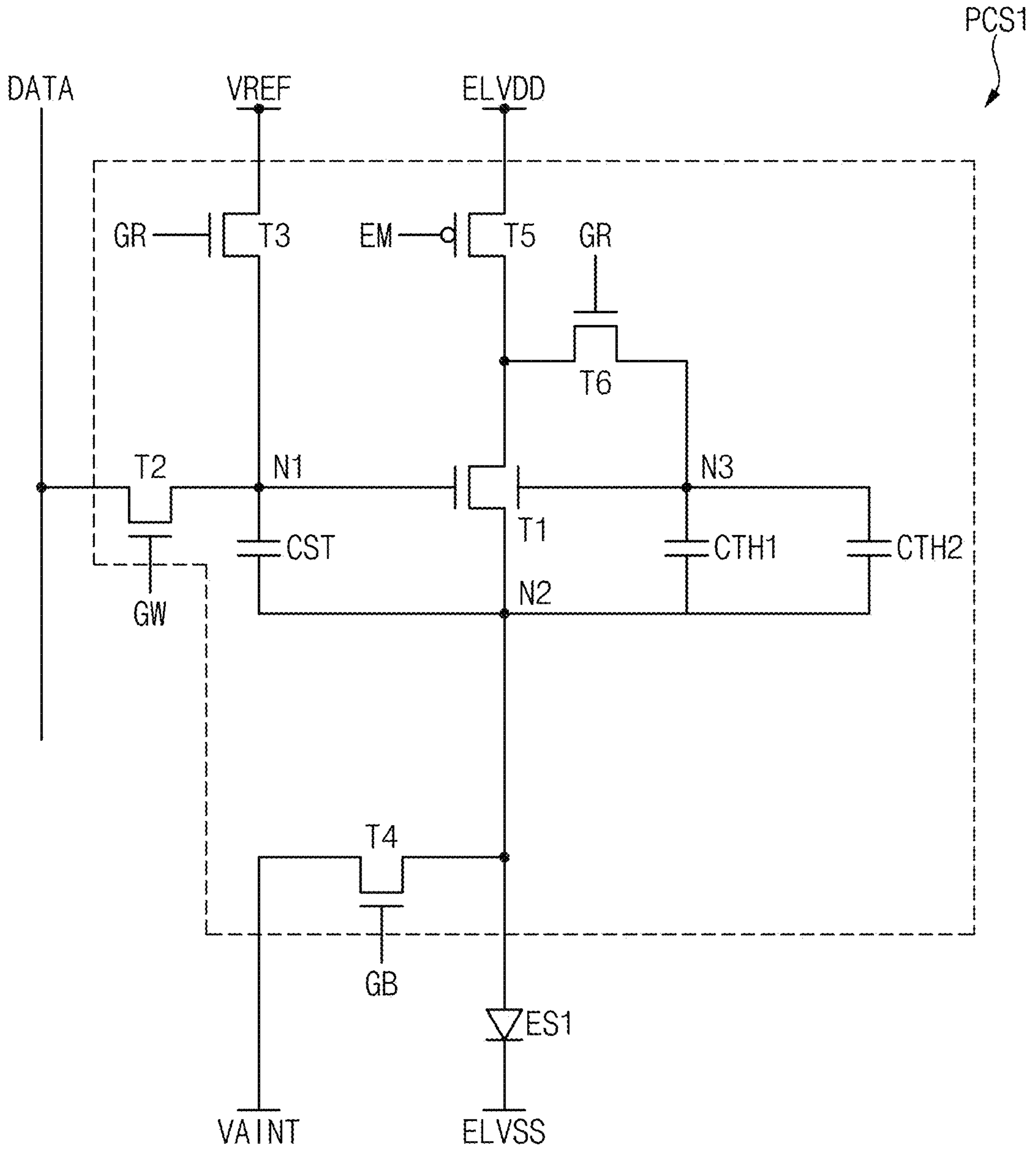
FIG. 26 is a circuit diagram illustrating a pixel circuit structure included in the display device of FIG. 25.
Figure 27:
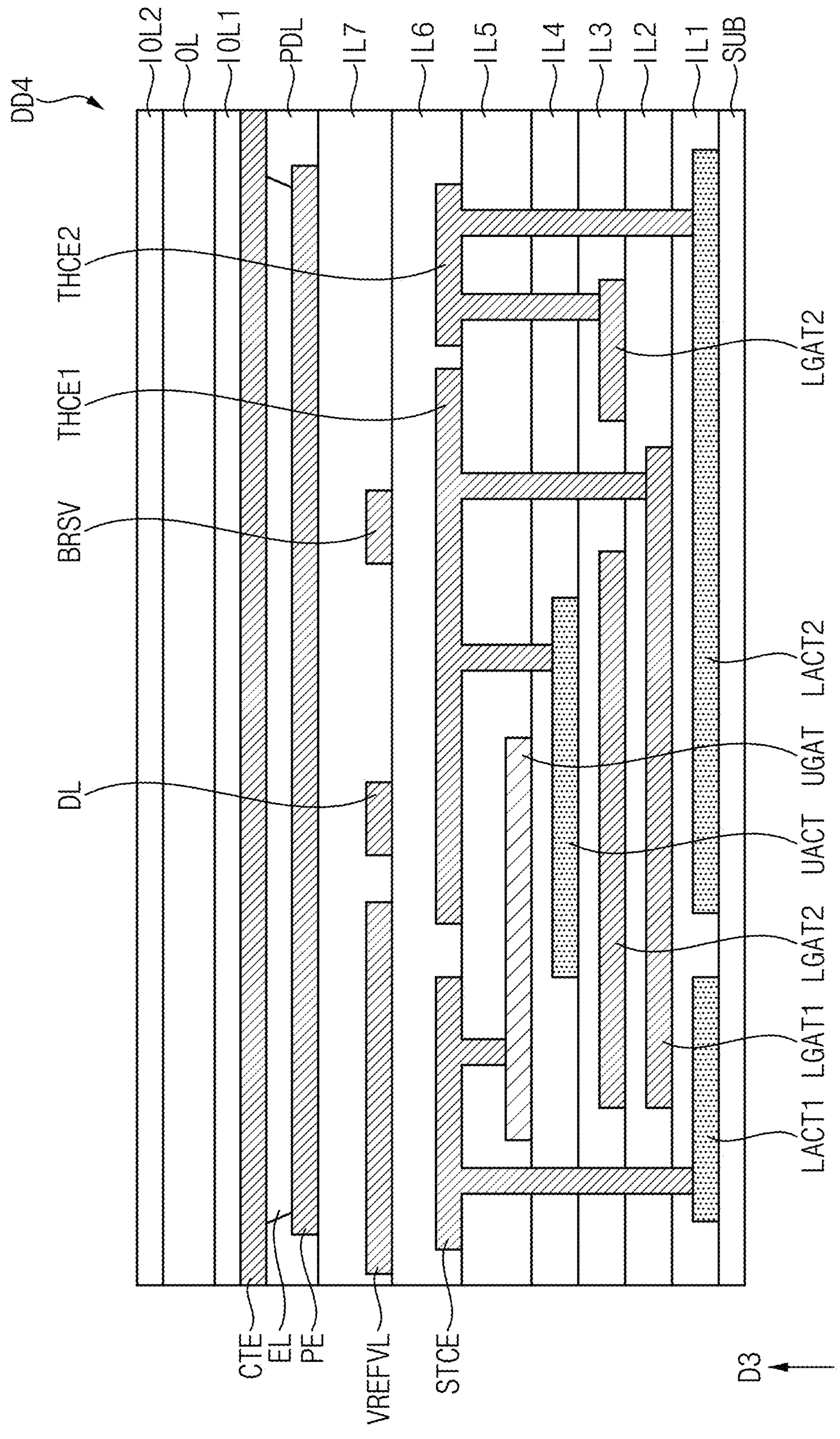
FIG. 27 is a cross-sectional view illustrating the display device of FIG. 25.

FIG. 25 is a cross-sectional view illustrating a display device according to an embodiment of the present disclosure. FIG. 26 is a circuit diagram illustrating a pixel circuit structure included in the display device of FIG. 25. FIG. 27 is a cross-sectional view illustrating the display device of FIG. 25.

A display device DD4 according to an embodiment of the present disclosure may include a substrate SUB, a pixel circuit layer PCL, a light-emitting layer ELL, and an encapsulation layer ENC.

The pixel circuit layer PCL may include at least one pixel circuit structure. For example, the pixel circuit layer PCL may include a first pixel circuit structure PCS1 and a second pixel circuit structure PCS2.

The light emitting layer ELL may include at least one light emitting structure. For example, the light emitting layer ELL may include a first light emitting structure ES1 and a second light emitting structure ES2.

The pixel circuit layer PCL may be disposed on the substrate SUB.

The first pixel circuit structure PCS1 and the second pixel circuit structure PCS2 may be arranged side by side along the first direction D1. Each of the first and second pixel circuit structures PCS1 and PCS2 may receive a signal or voltage and may generate a driving current.

The light emitting layer ELL may be disposed on the pixel circuit layer PCL.

The first and second light emitting structures ES1 and ES2 may be electrically connected to the first and second pixel circuit structures PCS1 and PCS2, respectively. The first light emitting structure ES1 may receive a driving current from the first pixel circuit structure PCS1 and may emit light. The second light emitting structure ES2 may receive a driving current from the second pixel circuit structure PCS2 and may emit light.

The encapsulating layer ENC may be disposed on the light emitting layer ELL. The encapsulating layer ENC may encapsulate the light emitting layer ELL.

The display device DD4 may be substantially the same as the display device DD1 described above with reference to FIG. 1, except for the first and second pixel circuit structures PCS1 and PCS2.

Referring to FIG. 26, the first pixel circuit structure PCS1 may provide a driving current to the first light emitting structure ES1. The first pixel circuit structure PCS1 may include a first transistor T1, a second transistor T2, a third transistor T3, a fourth transistor T4, a fifth transistor T5, a sixth transistor T6, a storage capacitor CST, a first compensation capacitor CTH1, and a second compensation capacitor CTH2.

The first to sixth transistors T1, T2, T3, T4, T5, and T6 may be substantially the same as the first to sixth transistors T1, T2, T3, T4, T5, and T6 described above with reference to FIG. 3.

The storage capacitor CST may include a first terminal and a second terminal.

The first terminal of the storage capacitor CST may be electrically connected to the first node N1.

The second terminal of the storage capacitor CST may be electrically connected to the second node N2.

The first compensation capacitor CTH1 may include a first terminal and a second terminal.

The first terminal of the first compensation capacitor CTH1 may be electrically connected to the second node N2.

The second terminal of the first compensation capacitor CTH1 may be electrically connected to the third node N3.

The second compensation capacitor CTH2 may include a first terminal and a second terminal.

The first terminal of the second compensation capacitor CTH2 may be electrically connected to the second node N2.

The second terminal of the second compensation capacitor CTH2 may be electrically connected to the third node N3.

Referring to FIG. 27, the display device DD4 may include a first lower active pattern LACT1, a second lower active pattern LACT2, a first lower gate electrode LGAT1, a second lower gate electrode LGAT2, an upper active pattern UACT, an upper gate electrode UGAT, a storage connection electrode STCE, a first compensation connection electrode THCE1, a second compensation connection electrode THCE2, a reference voltage vertical line VREFVL, a data line DL, a data voltage vertical connection line BRSV, a pixel electrode PE, an emission layer EL, and a common electrode CTE.

The display device DD4 may be substantially the same as the display device DD1 described above, except for the first lower active pattern LACT1, the second lower active pattern LACT2, the first lower gate electrode LGAT1, the second lower gate electrode LGAT2, the upper active pattern UACT, the upper gate electrode UGAT, the storage connection electrode STCE, the first compensation connection electrode THCE1, and the second compensation connection electrode THCE2.

The first lower active pattern LACT1 and the second lower active pattern LACT2 may be disposed on the substrate SUB.

In an embodiment, the first lower active pattern LACT1 and the second lower active pattern LACT2 may include silicon semiconductor. For example, the first lower active pattern LACT1 and the second lower active pattern LACT2 may include amorphous silicon or polycrystalline silicon.

Each of the first lower active pattern LACT1 and the second lower active pattern LACT2 may have an island shape, and the first lower active pattern LACT1 and the second lower active pattern LACT2 may be entirely doped with impurities.

For example, the first lower active pattern LACT1 may correspond to the first terminal of the storage capacitor CST, and the second lower active pattern LACT2 may correspond to the second terminal of the second compensation capacitor CTH2.

The first lower gate electrode LGAT1 may be disposed on the first insulating layer IL1.

The first lower gate electrode LGAT1 may have an island shape and may overlap the first lower active pattern LACT1 and the second lower active pattern LACT2.

For example, the first lower gate electrode LGAT1 may correspond to the second terminal of the storage capacitor CST. In addition, the first lower gate electrode LGAT1 may correspond to the first terminal of the first compensation capacitor CTH1 and the first terminal of the second compensation capacitor CTH2.

The second lower gate electrode LGAT2 may be disposed on the second insulating layer IL2.

The second lower gate electrode LGAT2 may have an island shape and may overlap the first lower active pattern LACT1, the second lower active pattern LACT2, and the first lower gate electrode LGAT1.

For example, the second lower gate electrode LGAT2 may correspond to the second terminal of the first compensation capacitor CTH1. In addition, the second lower gate electrode LGAT2 may correspond to the lower gate terminal of the first transistor T1.

The upper active pattern UACT may be disposed on the third insulating layer IL3.

In an embodiment, the upper active pattern UACT may include an oxide semiconductor.

The upper active pattern UACT may have an island shape and may overlap the second lower gate electrode LGAT2. In addition, the upper active pattern UACT may further overlap the first lower active pattern LACT1, the second lower active pattern LACT2, and the first lower gate electrode LGAT1.

The upper gate electrode UGAT may be disposed on the fourth insulating layer IL4.

The upper gate electrode UGAT may have an island shape and may overlap the upper active pattern UACT. In addition, the upper gate electrode UGAT may overlap the first lower active pattern LACT1, the second lower active pattern LACT2, the first lower gate electrode LGAT1, and the second lower gate electrode LGAT2.

The data voltage DATA may be applied to the upper gate electrode UGAT. The second lower gate electrode LGAT2, the upper active pattern UACT, and the upper gate electrode UGAT may form the first transistor T1.

The storage connection electrode STCE, the first compensation connection electrode THCE1, and the second compensation connection electrode THCE2 may be disposed on the fifth insulating layer IL5.

The storage connection electrode STCE may have an island shape and may contact the lower active pattern LACT and the upper gate electrode UGAT.

For example, the storage connection electrode STCE may contact the lower active pattern LACT and the upper gate electrode UGAT. In other words, the upper gate electrode UGAT can be electrically connected to the lower active pattern LACT through the storage connection electrode STCE.

The first compensation connection electrode THCE1 may have an island shape and may contact the first lower gate electrode LGAT1 and the upper active pattern UACT.

For example, the upper active pattern UACT may be electrically connected to the first lower gate electrode LGAT1 through the first compensation connection electrode THCE1.

The second compensation connection electrode THCE2 may have an island shape and may contact the second lower active pattern LACT2 and the second lower gate electrode LGAT2.

For example, the second lower gate electrode LGAT2 may be electrically connected to the second lower active pattern LACT2 through the second compensation connection electrode THCE1.

The first lower active pattern LACT1 and the first lower gate electrode LGAT1 may form the storage capacitor CST, the second lower active pattern LACT2 and the first lower gate electrode LGAT1 may form the second compensation capacitor CTH2, and the first lower gate electrode LGAT1 and the second lower gate electrode LGAT2 may form the first compensation capacitor CTH1.

Depending on the area of the first lower active pattern LACT1 and the area of the second lower active pattern LACT2, the capacitance of the storage capacitor CST and the capacitance of the second compensation capacitor CTH2 may be set.

The display device DD1, DD2, DD3, DD4 according to embodiments may be applied to various electronic devices. An electronic device according to an embodiment may include the display device DD1, DD2, DD3, DD4 described above, and may further include additional modules or devices having different functions than the display device DD1, DD2, DD3, DD4.

Figure 28:
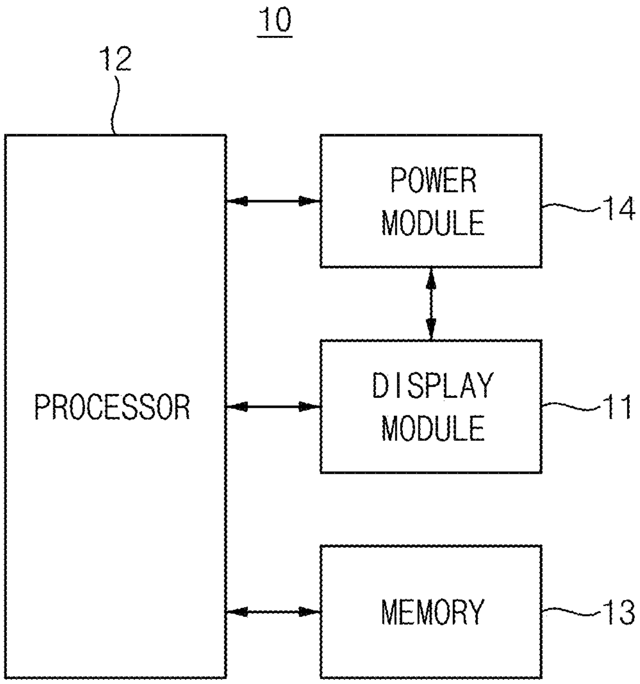
FIG. 28 is a block diagram illustrating an electronic device according to an embodiment of the present disclosure.

FIG. 28 is a block diagram illustrating an electronic device according to an embodiment of the present disclosure.

Referring to FIG. 28, an electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), or a controller.

The memory 13 may store data information necessary for the operation of the processor 12 or the display module 11. When the processor 12 executes an application stored in the memory 13, an image data signal or an input control signal may be transmitted to the display module 11, and the display module 11 may process the received signal and output image information through a display screen.

The power module 14 may include a power supply module such as a power adapter, a battery device, or the like, and a power conversion module that converts power supplied by the power supply module to generate power necessary for the operation of the electronic device 10.

At least one of the components of the electronic device 10 described above may be included in the display device according to embodiments described above. In addition, some of individual modules describe above may be included in the display device, and others may be provided separately from the display device. For example, the display device may include the display module 11, and the processor 12, the memory 13 and the power module 14 may be provided separately from the display device.

Figure 29:
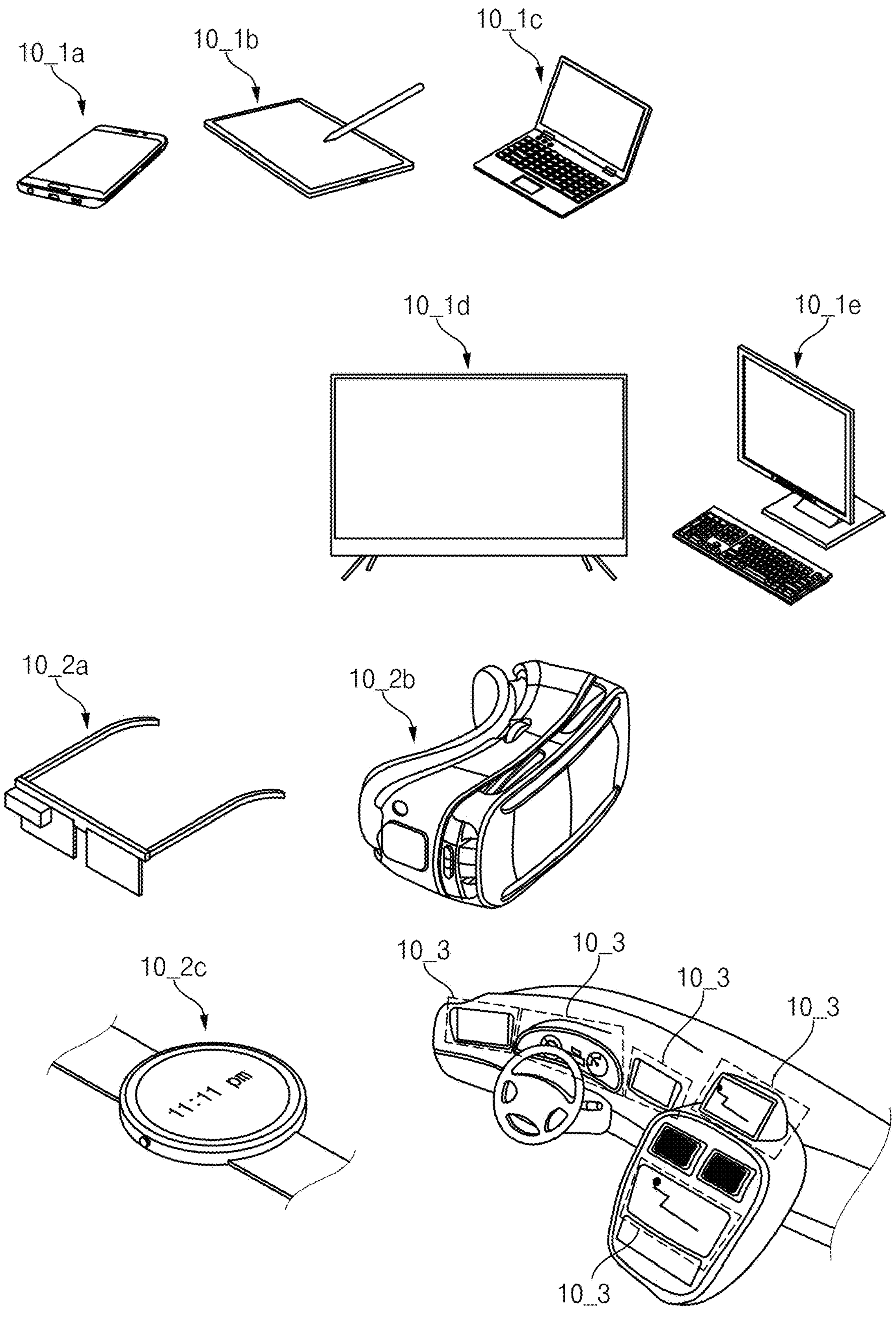
FIG. 29 is a schematic diagram of electronic devices.

FIG. 29 is a schematic diagram of electronic devices.

Referring to FIG. 29, various electronic devices to which the display device according to embodiments are applied may include not only an image display electronic device, but also a wearable electronic device including a display module, a vehicle electronic device 10_3 including a display module, or the like. The image display electronic device may be a smartphone 10_1*a*, a tablet PC 10_1*b*, a laptop 10_1*c*, a TV 10_1*d*, a desk monitor 10_1*e*, or the like. The wearable electronic device may be smart glasses 10_2*a*, a head mounted display 10_2*b*, a smart watch 10_2*c*, or the like. The vehicle electronic device 10_3 may be a center information display (CID) disposed on a dashboard and center fascia of a vehicle, a room mirror display, or the like.

Although the above has been explained with reference to embodiments of the present disclosure, it will be understood that a person with ordinary knowledge in the field of technology may modify and change the present disclosure in various ways without materially departing from the novel teaching and advantages of the present disclosure. Accordingly, it will be understood that all such modifications are intended to be included within the scope of the present disclosure as defined in the following claims.

What is claimed is:

1. A display device comprising:
- a first lower active pattern disposed on a substrate;
- a first lower gate electrode disposed on the first lower active pattern and forming a storage capacitor together with the first lower active pattern;
- a second lower gate electrode disposed on the first lower gate electrode and forming a first compensation capacitor together with the first lower gate electrode;
- an upper active pattern disposed on the second lower gate electrode and electrically connected to the first lower gate electrode; and
- an upper gate electrode disposed on the upper active pattern and electrically connected to the first lower active pattern.

2. The display device of claim 1, wherein the first lower gate electrode overlaps the first lower active pattern and the second lower gate electrode.

3. The display device of claim 1, wherein an area of the first lower active pattern is greater than an area of the upper gate electrode.

4. The display device of claim 1, wherein an area of the first lower gate electrode is greater than an area of the upper gate electrode.

5. The display device of claim 1, wherein an area of the second lower gate electrode is greater than an area of the upper gate electrode.

6. The display device of claim 1, wherein the second lower gate electrode, the upper active pattern, and the upper gate electrode form a driving transistor.

7. The display device of claim 6, wherein a data voltage is applied to the upper gate electrode.

8. The display device of claim 1, wherein each of the first lower active pattern, the first lower gate electrode, the second lower gate electrode, the upper active pattern, and the upper gate electrode has an island shape.

9. The display device of claim 1, further comprising:
- a storage connection electrode disposed on the upper gate electrode and connecting the first lower active pattern to the upper gate electrode.

10. The display device of claim 9, wherein the storage connection electrode has an island shape.

11. The display device of claim 9, further comprising:

a reference voltage vertical line disposed on the storage connection electrode and overlapping the storage connection electrode.

12. The display device of claim 1, further comprising:

a first compensation connection electrode disposed on the upper gate electrode and connecting the first lower gate electrode to the upper active pattern.

13. The display device of claim 12, wherein the first compensation connection electrode has an island shape.

14. The display device of claim 12, further comprising:

a data line disposed on the first compensation connection electrode, wherein the first compensation connection electrode overlaps the upper gate electrode and the data line.

15. The display device of claim 1, wherein the first lower active pattern includes a silicon semiconductor material, and wherein the first lower active pattern is entirely doped with impurities.

16. The display device of claim 15, further comprising:

a first active pattern disposed on a same layer as the first lower active pattern and including the silicon semiconductor material, and wherein the first active pattern is partially doped with impurities.

17. The display device of claim 1, wherein the upper gate electrode directly contacts the first lower active pattern.

18. The display device of claim 1, further comprising:

a second lower active pattern disposed on a same layer as the first lower active pattern, forming a second compensation capacitor together with the first lower gate electrode, and electrically connected to the second lower gate electrode;

a first compensation connection electrode disposed on the upper gate electrode and connecting the first lower gate electrode to the upper active pattern; and a second compensation connection electrode disposed on a same layer as the first compensation connection electrode and connecting the second lower active pattern to the second lower gate electrode.

19. A display device comprising:

a first lower active pattern disposed on a substrate;

a first lower gate electrode disposed on the first lower active pattern and forming a compensation capacitor together with the first lower active pattern;

a second lower gate electrode disposed on the first lower gate electrode and forming a storage capacitor together with the first lower gate electrode;

an upper active pattern disposed on the second lower gate electrode and electrically connected to the first lower gate electrode; and an upper gate electrode disposed on the upper active pattern and electrically connected to the first lower active pattern, wherein a data voltage is applied to the second lower gate electrode.

20. An electronic device comprising:

a host;

a display device receiving a control signal and image data from the host; and a power supply configured to provide power to the display device, wherein the display device comprises:

a first lower active pattern disposed on a substrate;

a first lower gate electrode disposed on the first lower active pattern and forming a storage capacitor together with the first lower active pattern;

a second lower gate electrode disposed on the first lower gate electrode and forming a first compensation capacitor together with the first lower gate electrode;

an upper active pattern disposed on the second lower gate electrode and electrically connected to the first lower gate electrode; and an upper gate electrode disposed on the upper active pattern and electrically connected to the first lower active pattern.

* * * * *